United States Patent
Sahoo

(10) Patent No.: US 11,197,148 B2
(45) Date of Patent: *Dec. 7, 2021

(54) DYNAMIC COMMUNICATION

(71) Applicant: **E*TRADE Financial Corporation**, San Francisco, CA (US)

(72) Inventor: Sanjib Sahoo, Naperville, IL (US)

(73) Assignee: **E*TRADE Financial Holdings, LLC**, New York, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/863,102

(22) Filed: Apr. 30, 2020

(65) Prior Publication Data

US 2020/0260260 A1    Aug. 13, 2020

Related U.S. Application Data

(63) Continuation of application No. 16/571,869, filed on Sep. 16, 2019, now Pat. No. 10,687,208, which is a continuation of application No. 16/238,302, filed on Jan. 2, 2019, now Pat. No. 10,462,650, which is a continuation of application No. 16/120,686, filed on Sep. 4, 2018, now Pat. No. 10,212,581, which is a continuation of application No. 13/725,201, filed on Dec. 21, 2012, now Pat. No. 10,097,989.

(51) Int. Cl.
*H04W 8/22* (2009.01)
*H04W 4/18* (2009.01)

(52) U.S. Cl.
CPC .............. *H04W 8/22* (2013.01); *H04W 4/18* (2013.01)

(58) Field of Classification Search
CPC ....... H04W 8/22; H04W 12/06; H04W 4/001; H04W 4/08; H04W 4/14; H04W 8/24; H04L 67/42; H04L 65/40
See application file for complete search history.

(56) References Cited

U.S. PATENT DOCUMENTS

| | | |
|---|---|---|
| 4,949,248 A | 8/1990 | Caro |
| 6,088,511 A | 7/2000 | Hardwick |

(Continued)

FOREIGN PATENT DOCUMENTS

| | | |
|---|---|---|
| EP | 1317109 | 6/2003 |
| WO | WO2007/064158 A1 | 6/2007 |

OTHER PUBLICATIONS

European Search Report, from EP Application No. 13199264.6, dated Apr. 11, 2014.

(Continued)

*Primary Examiner* — Liton Miah
(74) *Attorney, Agent, or Firm* — Lempia Summerfield Katz LLC

(57) ABSTRACT

The disclosed embodiments relate to provisioning of a service, such as a financial service, to a device, such as a mobile device operative to access the service wirelessly or otherwise, in a manner which efficiently provides a consistent user experience which meets a user's expectations as to the functionality and quality of the service, including the user interface therefore and service delivery, which leverages the available capacities of the devices through which the service is provided so as to maximize the functionality and quality of the provided service without diminishing the experience, i.e. without substantially reducing the quality or functionality.

21 Claims, 15 Drawing Sheets

(56) References Cited

U.S. PATENT DOCUMENTS

| | | |
|---|---|---|
| 6,578,066 B1 | 6/2003 | Logan et al. |
| 7,350,152 B2 | 3/2008 | DeLuca et al. |
| 7,533,170 B2 | 5/2009 | Fellenstein et al. |
| 7,743,001 B1 | 6/2010 | Vermeulen et al. |
| 7,940,686 B2 | 5/2011 | Lehew et al. |
| 7,966,039 B2 | 6/2011 | Sadovsky et al. |
| 8,050,242 B2 | 11/2011 | Lipford et al. |
| 8,099,487 B1 | 1/2012 | Smirnov et al. |
| 8,260,893 B1 | 9/2012 | Bandhole et al. |
| 8,266,670 B1 | 9/2012 | Merkow et al. |
| 8,332,793 B2 | 12/2012 | Bose |
| 8,457,603 B2 | 6/2013 | El-Kadri et al. |
| 8,782,236 B1 | 7/2014 | Marshall et al. |
| 8,805,790 B1 | 8/2014 | Chan et al. |
| 8,824,274 B1 | 9/2014 | Medved et al. |
| 9,253,015 B2 * | 2/2016 | Girard ................ H04L 29/0818 |
| 9,311,158 B2 | 4/2016 | Tompkins |
| 9,379,903 B1 | 6/2016 | McAlister et al. |
| 2002/0029274 A1 | 3/2002 | Allen |
| 2002/0099456 A1 | 7/2002 | McLean |
| 2002/0143901 A1 | 10/2002 | Lupo et al. |
| 2002/0188734 A1 | 12/2002 | Johnson |
| 2003/0110239 A1 * | 6/2003 | Sugumoto ................ G06F 8/60 709/219 |
| 2004/0015568 A1 * | 1/2004 | Kaakani ................ G06F 8/60 709/220 |
| 2004/0064548 A1 | 4/2004 | Adams et al. |
| 2004/0201618 A1 | 10/2004 | Alderson |
| 2004/0249939 A1 | 12/2004 | Amini et al. |
| 2005/0083854 A1 | 4/2005 | Nagarajrao et al. |
| 2005/0246448 A1 | 11/2005 | Sankaran et al. |
| 2005/0251573 A1 | 11/2005 | Merkow et al. |
| 2006/0009980 A1 | 1/2006 | Burke et al. |
| 2006/0045023 A1 | 3/2006 | Kim et al. |
| 2006/0126667 A1 | 6/2006 | Smith et al. |
| 2006/0258375 A1 | 11/2006 | Wilbrink et al. |
| 2007/0070890 A1 | 3/2007 | Rojahn |
| 2007/0097130 A1 | 5/2007 | Margulis |
| 2007/0101019 A1 | 5/2007 | Cromer et al. |
| 2007/0150846 A1 | 6/2007 | Furnish et al. |
| 2008/0178165 A1 | 7/2008 | Baker |
| 2009/0061927 A1 | 3/2009 | Lam et al. |
| 2009/0265648 A1 * | 10/2009 | Ryu ................ G06F 9/452 715/764 |
| 2009/0271485 A1 | 10/2009 | Sawyer et al. |
| 2009/0300210 A1 | 12/2009 | Ferris |
| 2010/0005288 A1 | 1/2010 | Rao et al. |
| 2010/0318630 A1 | 12/2010 | Howell et al. |
| 2011/0022697 A1 | 1/2011 | Huh |
| 2011/0149763 A1 | 6/2011 | Bae |
| 2011/0225591 A1 | 9/2011 | Wada et al. |
| 2011/0276982 A1 | 11/2011 | Nakayama et al. |
| 2011/0320520 A1 | 12/2011 | Jain |
| 2012/0072917 A1 | 3/2012 | Boldyrev et al. |
| 2012/0166645 A1 | 6/2012 | Boldyrev et al. |
| 2012/0185913 A1 | 7/2012 | Martinez et al. |
| 2012/0233486 A1 | 9/2012 | Phull et al. |
| 2012/0246310 A1 | 9/2012 | Broda et al. |
| 2012/0254280 A1 | 10/2012 | Parker, II |
| 2012/0272223 A1 | 10/2012 | Persson et al. |
| 2013/0065554 A1 | 3/2013 | Doyle |
| 2013/0185436 A1 | 7/2013 | Carlin et al. |
| 2013/0205158 A1 | 8/2013 | Lin et al. |
| 2013/0275752 A1 | 10/2013 | Zhang et al. |
| 2013/0336337 A1 | 12/2013 | Gopinath et al. |
| 2014/0086256 A1 | 3/2014 | Raniere |
| 2016/0321572 A9 | 11/2016 | Martinez et al. |
| 2017/0103127 A1 | 4/2017 | Hanson et al. |

OTHER PUBLICATIONS

Extended European Search Report in EP Application No. 13199262.1, dated Apr. 16, 2014, 11 pages.

Extended European Search Report, from EP 13199263.8, dated Sep. 24, 2015, EP.

ISO/IEC 23009-1, "Information Technology Dynamic Adaptive Steaming Over HTTP (DASH)—Part 1: Media Presentation Description and Segmen Formats", from URL:http://standards.iso.org/ittf/publiclyavailablestandards/c057623_ISO_IEC_23009-12012.zip.

Liu et al., "Toward Easy Delivery of Device-Oriented Adaptive User Interface on Mobile Devices", Information Science and Service Science (NISS), 2011 5th International Conference on New Trends in IEEE, Oct. 24, 2011, 6 pages.

Partial European Search Report, from EP Application No. 13199263.8, dated May 12, 2015, EP.

Ronan Cremin, "Mobile Web Content Adaptation Techniques", Nov. 2012, 7 pages, http://mobiforge.com/starting/story/mobile-web-content-adaptation-techniques.

Ronan Cremin, "Server-Side Mobile Web Detection Used by 82% of Alexa Top 100 Sites", CircleID, Jan. 11, 2012, 3 pages.

* cited by examiner

1000

DYNAMIC COMMUNICATION

RELATED APPLICATIONS

This application is a continuation under 37 C.F.R. § 1.53(b) of U.S. patent application Ser. No. 16/571,869, filed Sep. 16, 2019, entitled "DYNAMIC COMMUNICATION," now U.S. Pat. No. 10,687,208, which is a continuation under 37 C.F.R. § 1.53(b) of U.S. patent application Ser. No. 16/238,302, filed Jan. 2, 2019, entitled "DYNAMIC COMMUNICATION," now U.S. Pat. No. 10,462,650, which is a continuation under 37 C.F.R. § 1.53(b) of U.S. patent application Ser. No. 16/120,686, filed Sep. 4, 2018, entitled "DYNAMIC COMMUNICATION," now U.S. Pat. No. 10,212,581, which is a continuation under 37 C.F.R. § 1.53(b) of U.S. patent application Ser. No. 13/725,201 filed Dec. 21, 2012, entitled "DYNAMIC COMMUNICATION," now U.S. Pat. No. 10,097,989, the entire disclosures of which are incorporated by reference in their entirety.

The present patent application is related to patent application Ser. No. 13/724,913 filed on Dec. 21, 2012, entitled "DYNAMIC PRESENTATION," now abandoned, the entire disclosure of which is incorporated by reference herein.

The present patent application is related to patent application Ser. No. 13/725,145, filed on Dec. 21, 2012, entitled "DYNAMIC EXECUTION," now U.S. Pat. No. 9,992,306, the entire disclosure of which is incorporated by reference herein.

BACKGROUND

Provisioning of services, such as financial services, to devices, such as mobile devices, including smart phones, tablet devices, etc., is challenging due, at least in part, to their limited capabilities, e.g. limited processing power, battery power, screen size, connectivity, etc. as well as the ever growing variety of devices, for which the capability of the devices may vary, e.g. display size and/or resolution, computational capability, maximum wireless bandwidth, storage capacity, etc. Such provisioning of services is further complicated by the operational capacity, i.e., the dynamic nature of the utilization/availability of those device capabilities due operation of the device by the user and/or as a consequence of the dynamic nature of the mobile environment. As such, at any given moment, devices having different capabilities, some more limited than others, and/or having different available portions/capacity thereof, may be trying to access a given service.

Provisioning of services, such as financial services, to devices, such as mobile devices, including smart phones, tablet devices, etc., is challenging due, at least in part, to their limited capabilities, e.g. limited processing power, battery power, screen size, connectivity, etc. as well as the ever growing variety of devices, for which the capability of the devices may vary, e.g. display size and/or resolution, computational capability, maximum wireless bandwidth, storage capacity, etc. Such provisioning of services is further complicated by the operational capacity, i.e., the dynamic nature of the utilization/availability of those device capabilities due operation of the device by the user and/or as a consequence of the dynamic nature of the mobile environment. As such, at any given moment, devices having different capabilities, some more limited than others, and/or having different available portions/capacity thereof, may be trying to access a given service.

In all cases, it is desirable to efficiently provide a consistent user experience which meets a user's expectations as to the functionality and quality of service, including the user interface and service delivery, which leverages the available capacities of the devices through which the service is provided so as to maximize the functionality and quality of the provided service without diminishing the experience, i.e. without substantially reducing the quality of user experience of the service or functionality provided by it.

DETAILED DESCRIPTION

Figure 1:
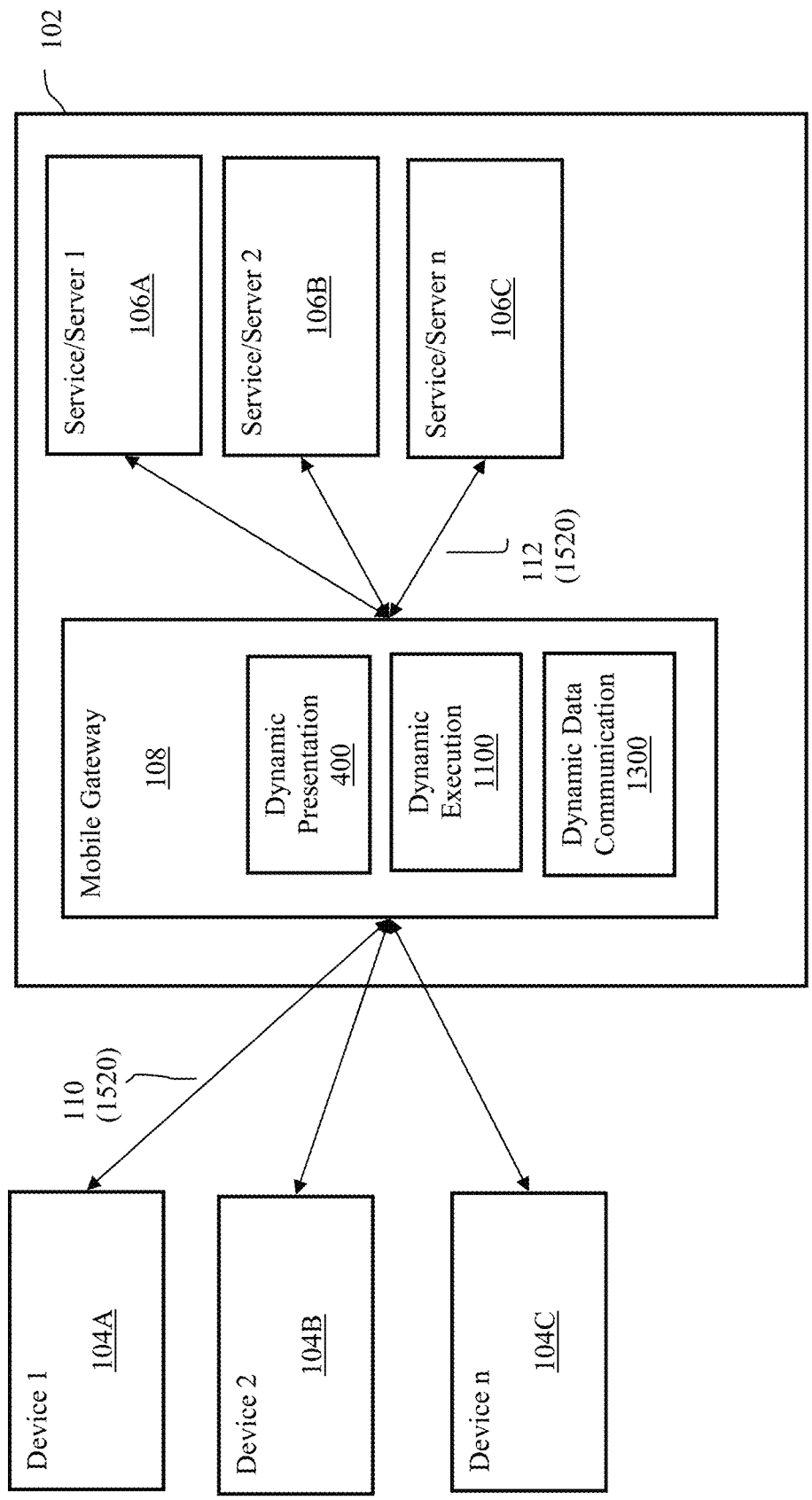
FIG. 1 depicts a system for provisioning services to devices according to one embodiment.

The disclosed embodiments relate to provisioning of a service, such as a financial service, to a device, such as a mobile device operative to access the service wirelessly or otherwise, in a manner which efficiently provides a consistent user experience which meets a user's expectations as to the functionality and quality of the service, including the user interface therefore and service delivery, and further which leverages the available capacities of the devices through which the service is provided so as to maximize the functionality and quality of the provided service without diminishing the experience, i.e. without substantially reducing the quality of the user experience of the service or functionality provided thereby.

While the disclosed embodiments will be discussed with respect to mobile devices, such as smart phones, tablet computing devices, cellular telephones, laptop computers, proprietary devices, devices suitably adapted to be mobile, etc., which access or otherwise utilize the services described herein via a communication medium, at least a part of which may include a wireless component, it will be appreciated that the disclosed embodiments may be utilized with any suitable device, such as the computer device 1500 described below with respect to FIG. 15, which may access or utilize the service via any type of communication medium. In particular, the disclosed embodiments may improve the provisioning of a service, e.g. the efficiency thereof, and/or the user experience therewith, among devices of varying capabilities and varying available portions thereof, accessing or otherwise utilizing the service via a limited and/or varying bandwidth communications medium.

As used herein, the capabilities of a device refers to the specific features, specifications, configurations, functions, components, abilities, or other capabilities of the device such as the screen size, screen resolution, refresh rate, processor speed, co-processor availability (e.g. math coprocessor, digital signal processor, floating point co-processor, graphics processor), working/volatile memory capacity (e.g. RAM), storage/non-volatile memory capacity (e.g. flash memory, hard disk, solid state disk, etc.), power type/capacity (e.g. battery, plugged in with power, etc.), available input devices (e.g. touch screen, keyboard, buttons, audio, optical, etc.), available output devices (e.g. visual indicators, audio, physical/vibration), available sensors (e.g. optical, audio, proximity, thermal, pressure, acceleration, magnetic, compass, GPS, near field communications, RFID), communications (e.g. cellular, 3G, 4G, Wi-Fi, Bluetooth, Zigbee, RF), or any other feature or device capability now available or later developed. Furthermore, reference herein will be made to the currently available portion or capacity of any one or more these capabilities, also referred to as an operating or operational capacity, wherein at any given moment, depending upon usage or environmental factors, a portion of the maximum available amount of the particular capability may be consumed or otherwise unavailable and this may change over time. For example, depending upon the usage of the device, less than all of the operating memory, storage or processing capability may be available. Furthermore, depending upon usage and/or environmental factors, such as location, less than the maximum communications bandwidth may be available. It will be appreciated that some capabilities, such as screen size or resolution do not change though the amount available screen area for display may vary based on usage of applications on the device. Further, diminished capacity of one capability may reduce the available capacity of another capability. For example, limited processing capacity may further limit the available display capacity as the ability to display data, such as graphic images, may be dependent upon the processing capability. It will be appreciated that, for convenience, devices may be classified as having similar sets of capabilities. For example, devices having touch screen interfaces may be classified together and devices having the same screen size may be classified together. Classifications may overlap, i.e. a device may belong to more than one classification, e.g. both the touch screen classification and the particular screen size classification.

While the disclosed embodiments will be discussed with respect to the provisioning of financial services, such as trading services, i.e. the facilitation of the placement, viewing or cancellation of orders to trade financial instruments and view the results thereof, market monitoring services, i.e. access to market data, which may be continuously updated, representative of the present state of a financial market, and/or financial analysis services, i.e. analysis of market and/or account or portfolio data and derivation of metrics and other data therefrom, it will be appreciated that the disclosed embodiments may be applicable to the provisioning of other services including, for example, content delivery services, complex analytical or derivation services, and the like. In particular, it will be appreciated that the disclosed embodiments may be applicable to services based on continuously, e.g. a data stream, updated or changing time-sensitive data, data having a limited life span or limited time of relevance, i.e. data which may expire or otherwise become stale substantially subsequent to the availability or generation thereof, and for which the same data may be provided, or otherwise be of interest, to multiple recipients. For example, market data, such as current market prices for financial instruments, may be constantly changing due to the economic forces at work in the market, e.g. the negotiating, buying and/or selling activities of the market participants, e.g. traders. Accordingly, when a price for a financial instrument is derived, it may only be relevant for a short period of time, e.g. a few milliseconds, before the market has again changed and a previously derived price is no longer an accurate reflection of the current price. Furthermore, it may important that all of the recipients of the market data see substantially the same data, e.g. price, at the same time, so as to, for example, prevent one market participant from having an unfair advantage over another. Other similar types of data may include live video or audio streams, such as may be used in real time applications, e.g. tele-surgery, wherein each image or audio sample is only relevant so long as it reflects the current "ground truth" of the subject matter, video games, such as multiplayer games, or otherwise where multiple participants may be accessing the same data stream, e.g. video or audio, and need to experience the stream substantially simultaneously, e.g. because they may be collaborating or competing, etc. In addition, the disclosed embodiments may be applicable to the provisioning of services which require substantial computational resources. In addition to financial analysis services, e.g. profit and loss calculations, account balance calculations, implied volatility calculations, calculation of metrics of risk in financial positions, referred to as "greeks," performance metric calculations, strategy identification, margin/risk calculations, implied opportunity identification, etc., other computationally intensive services to which the disclosed embodiments may be applied include augmented reality, graphic rendering, language translation, speech to/from text conversion, geographic navigation routing, etc. Furthermore, the disclosed embodiments may be utilized for the provisioning of services, such as the time-sensitive based services and/or computationally intensive services described above, over limited and/or varying bandwidth communications media, such as wireless, e.g. cellular, Wi-Fi, etc., media, where the available bandwidth may vary over time. As will be described, one or more services, or portions thereof, may be provided via an application program which may be executed by the device to which the service is to be provided, by the server providing the service, by an intermediary device between the server and the device, or a combination thereof, as will be described.

It will be appreciated that a service, as referred to herein, may refer to a collection, related or otherwise, of multiple functions or operations, or each such function or operation may be considered a service. Furthermore, as used herein, the term "service" may refer to one of or both the user interface, or elements thereof, which facilitate a user's access to particular data, functions and/or operations, or the particular data, functions and/or operations themselves. A user interface may be an application program executed on the device via which a service is to be provided or may be executed remotely, such as on a remote server or intermediary in communication, e.g. at least in part via a wireless connection, with the device wherein the elements of the user interface are presented visually or otherwise via the device. A user interface may be composed of user interface elements or components such as input components, output components and/or combinations thereof. Input components may include components which receive input or otherwise detect interaction by the user with the device, such as via an input device, e.g. a touch screen, keyboard, scroll wheel, one or more buttons, touch based input device, microphone, etc. Input components may include menus or other constructs which allow a user to choose among options or otherwise select from a list, input fields or other constructs which allow a user to provide data and/or other constructs which allow a user to signal intent. Input components may further include components which interact with and receive data, such as ambient data, from the environment in which the device is located, such as via sensors or other input/output mechanisms deployed on the device such as the microphone, camera, proximity sensor, near field communications device, RFID device, GPS, a GPS, ambient light sensor, accelerometer, thermal sensor, etc. Output components of the user interface may include audible and/or visual indicators (e.g. graphic user interface ("GUI") elements), displayed on the device's display screen or utilizing other visual indicators, such as LED's, text and/or graphic data displays, or physical outputs, such as vibrations (e.g. via a device's vibration motor). A user interface may be integrated with the underlying functional/operational components in an application program and/or operating system. Alternatively, or in addition thereto, the user interface may be implemented separately from the underlying functional/operational components of an application or operating system.

As will be described in more detail below, the disclosed service provisioning may include, for example, dynamically adjusting user interface presentations, and/or varying the type and functionality of components thereof, to align with the current display and user input capabilities of the user's particular device, and/or available capacity thereof, adjusting to the currently available computational, storage, and/or power capacity of the user's particular device, and/or adjusting bandwidth utilization to provide the desired services over the communications bandwidth presently available between the service provider and the user's particular device.

Other solutions to the problem of efficient service provisioning to devices, such as mobile wireless devices, of varying capabilities have included creating a single user interface/application, for facilitating access to the service, which is optimized or otherwise normalized to operate in conjunction with multiple devices having different capabilities. However, such user interfaces/applications, which effectively cater to the lowest common denominator of device capabilities, may deny users of more capable devices a user interface/experience which leverages those capabilities. Alternatively, a service provider may design different user interfaces/applications for different devices, each being designed to leverage the particular device capabilities. However, creation of a user interface/application is complex, let alone creation of multiple user interfaces/applications and the service provider must maintain all of the different versions to ensure that they are kept up to date and free of defects, as well as release new versions to support new devices or new capabilities, which increases costs and consumes resources. Furthermore, neither solution accounts for the dynamic nature of the mobile environment where, despite the capabilities of a given device, the available capacity thereof is constantly changing, e.g. as the user loads or removes software from their device, available storage capacity is consumed or released, as the user executes that software, available processing, operating memory, and/or communications capacity are consumed, as the user moves, the quality and strength of their wireless connection, and thereby the available bandwidth, changes. Accordingly, a user interface/application may provide a satisfactory user experience at one moment and an unsatisfactory experience at another moment.

In some cases, this dynamic shift in user experience is expected and even tolerated. For example, in media streaming where entertainment content, such as video or audio content, is streamed to a device for viewing by a user, pauses and/or delays in the presentation, such as due to the processing capability of the user's device or the quality of their wireless connection, may be expected and/or tolerated by the user. In some cases, the provisioning of the service may even be compromised to accommodate such issues and improve the user experience. For example, a media/content/data streaming service may introduce buffering to reduce such pauses or delays and accommodate for the deficiencies in the device or the connection. With buffering, the user may have to wait, after initiating the service, for sufficient content to be stored within their device or at some intermediate location, before the service starts, e.g. before the video starts playing. This delay may be tolerable to avoid interruptions once the service is commenced. Furthermore, different users accessing the same content may experience different levels of buffering, and the resultant delays caused thereby, depending upon the capabilities of their devices and the available portions thereof. So, two users who each initiate a stream of the same video at substantially the same time, may in fact end up experiencing that video at different times as each stream is buffered differently. Again, in such a situation, this may not be a problem as the concern is typically with respect to each user's individual experience.

However, for some services, such as services based on continuously, e.g. a data stream, updated or changing time-sensitive data, data having a limited life span or limited time of relevance and/or data which must be experienced by users substantially simultaneously, buffering may not be an option, e.g., for services which deliver and present data in real time to the user's device, buffering may delay the presentation of the information beyond the time of relevance thereof or otherwise result in asymmetric delivery among multiple recipients. For example, for financial market data services, the delivery and presentation of market data, e.g. market prices, substantially symmetrically to multiple users, such as traders, substantially in real time, i.e. as quickly as possible after that data was generated, is critical to allow the users/traders to fairly act on the most current market information. A delay may result in a trader trading at the wrong price, or one trader garnering an unfair advantage over other traders, which may result in risk and/or financial exposure for the user/trader and/or the entity on behalf of which they trade. Other examples of services which depend on real time presentation include multiplayer video games and live video feeds, such as may be used for security monitoring or health care, such as tele-surgery, where a delay, asymmetric among multiple recipients or otherwise, in receipt may result in an inappropriate or incorrect response to the current state.

In particular, the disclosed embodiments relate to provisioning of services, such as delivery and presentation of data in real time, to devices, such as mobile devices, having varying capabilities and dynamically available portions thereof. The disclosed embodiments adjust, at the time of provisioning of the service, e.g. at run time, to the capabilities of a particular device requesting access thereto and further to the available portion of those capabilities, to optimize the user experience. In particular, a tailored user interface for facilitating access to the service may be provided, which includes components suitable to the device capabilities and available portion thereof. Further, communication of data in furtherance of the service may be dynamically adjusted to accommodate for changes in the available communications capability. In addition, processing tasks to be executed in furtherance of the service are dynamically allocated between the service provider and the user's device to accommodate for the available processing resources thereof.

FIG. 1 shows a system 100 for provisioning services 106 to devices 104 according to the disclosed embodiments. Referring to FIG. 1, in one embodiment, the devices 104, such as mobile devices 104, and/or the applications executing thereon, such as a mobile applications for financial services, e.g. trading, which may require performance, speed, reliability, security, fault tolerance, substantially symmetric access/delivery and/or device resource intensive computations, access the services 106 via an intermediary, which may include push servers 114 and or a mobile gateway 108, which may be implemented as intelligent middleware between the devices 104 and services 106. As used herein, a service refers to either or both a particular function or operation, or a set thereof, executed by a server, by a device or a combination thereof, and to a server or other device or entity which may provide or otherwise facilitate the provision of the particular function(s) or operation(s). While the intermediary may be referred to as a "mobile gateway 108," it will be appreciated that the functionality not limited to mobile devices, as was described above. Furthermore, while the functionality of the mobile gateway 108 and push servers 114 will be separately discussed, it will be appreciated that, in at least one implementation, the disclosed functionality may be integrated with one or more of the services 106. For example, market data may be generated by one or more financial exchanges. Once generated, market data may be provided to one or more service providers or data aggregators which facilitate the dissemination and delivery of the market data to the end users. As used herein, a service/server 106 may refer to any provider of the market data including the originating financial exchanges and any intermediary which receives and retransmits the market data therefrom. As will be discussed below, in one implementation, a market data service, to which traders may subscribe, such as for a fee, so as to receive market data, may include a pricing server or other server 106 which receives the market data from a source, such as the financial exchanges or other intermediate provider, aggregates the market data and/or otherwise prepares is for further dissemination to the subscribers. The pricing server 106 may then be coupled with a push server 114 which is operative to accomplish the delivery of the market data to the subscribers.

Figure 2:
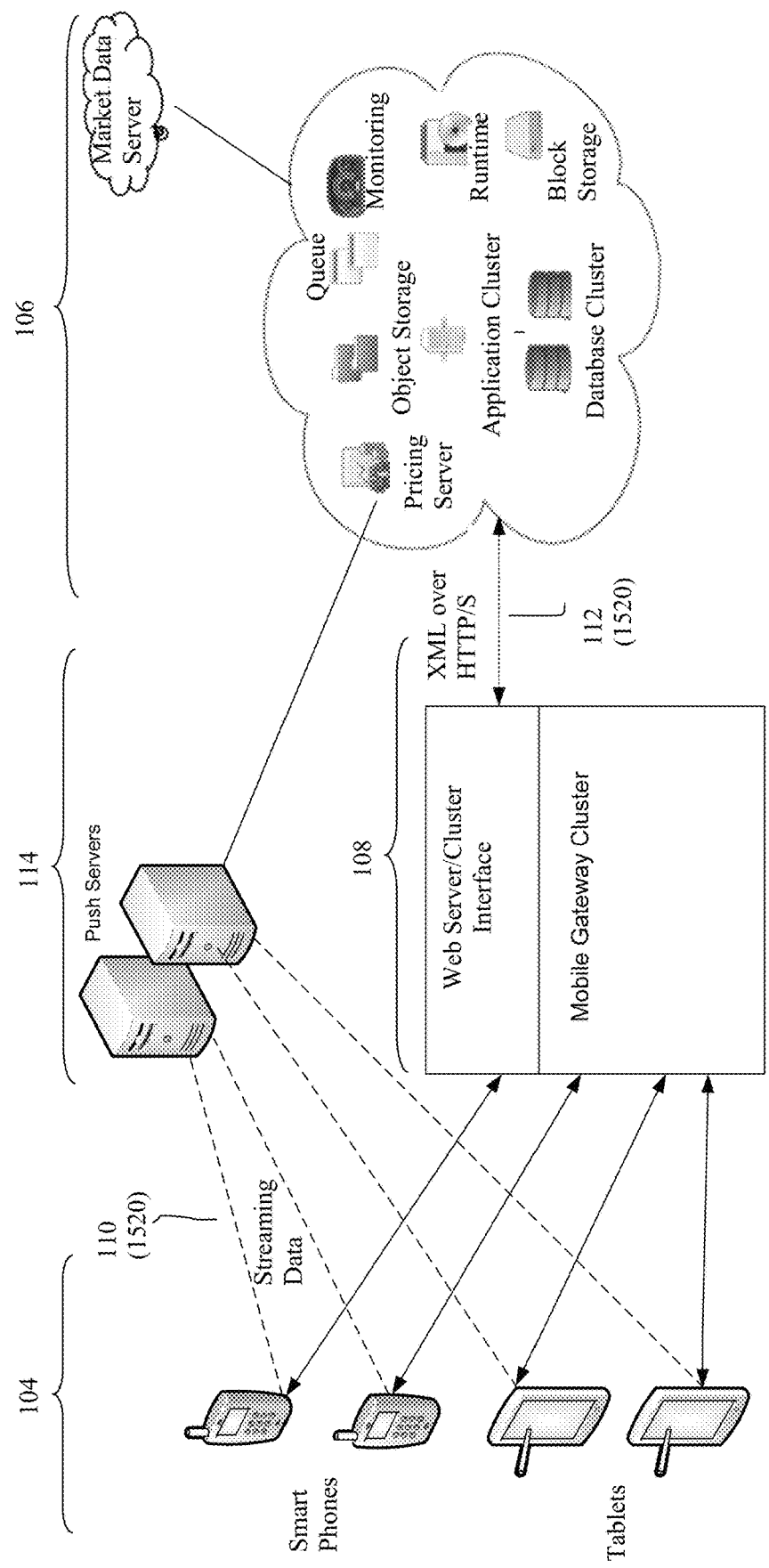
FIG. 2 depicts a block diagram of an exemplary implementation of the system of FIG. 1.

FIG. 2 depicts an exemplary implementation of the system 100 of FIG. 1. In particular, FIG. 2 depicts different types of mobile devices 104, e.g. smartphones and tablet computing devices, which subscribe to a market data feed or other service provided by the servers 106 via the one or more push server(s) 114 (e.g. one or more server clusters). The push server(s) 114 and mobile gateway 108 may form a logical intermediary layer which manages the delivery of the service to the devices 104 from the servers 106. The push server(s) 114, which deliver the data to the devices 104, may utilize persistent connections, such as a persistent HTTP connection, to push, or otherwise, stream data to those devices 104, or may use on demand connections to facilitate access to the services provided by the servers 106. As will be further described below, the mobile gateway 108, which may be implemented by one or more servers or server clusters and which may be coupled with the device 104 via a logically separate connection (e.g. a different logical layer), such as using a restful web services connection over HTTP/S, manages the provisioning of the service as further described herein to accommodate the device 104 capabilities and available capacities thereof.

Figure 3:
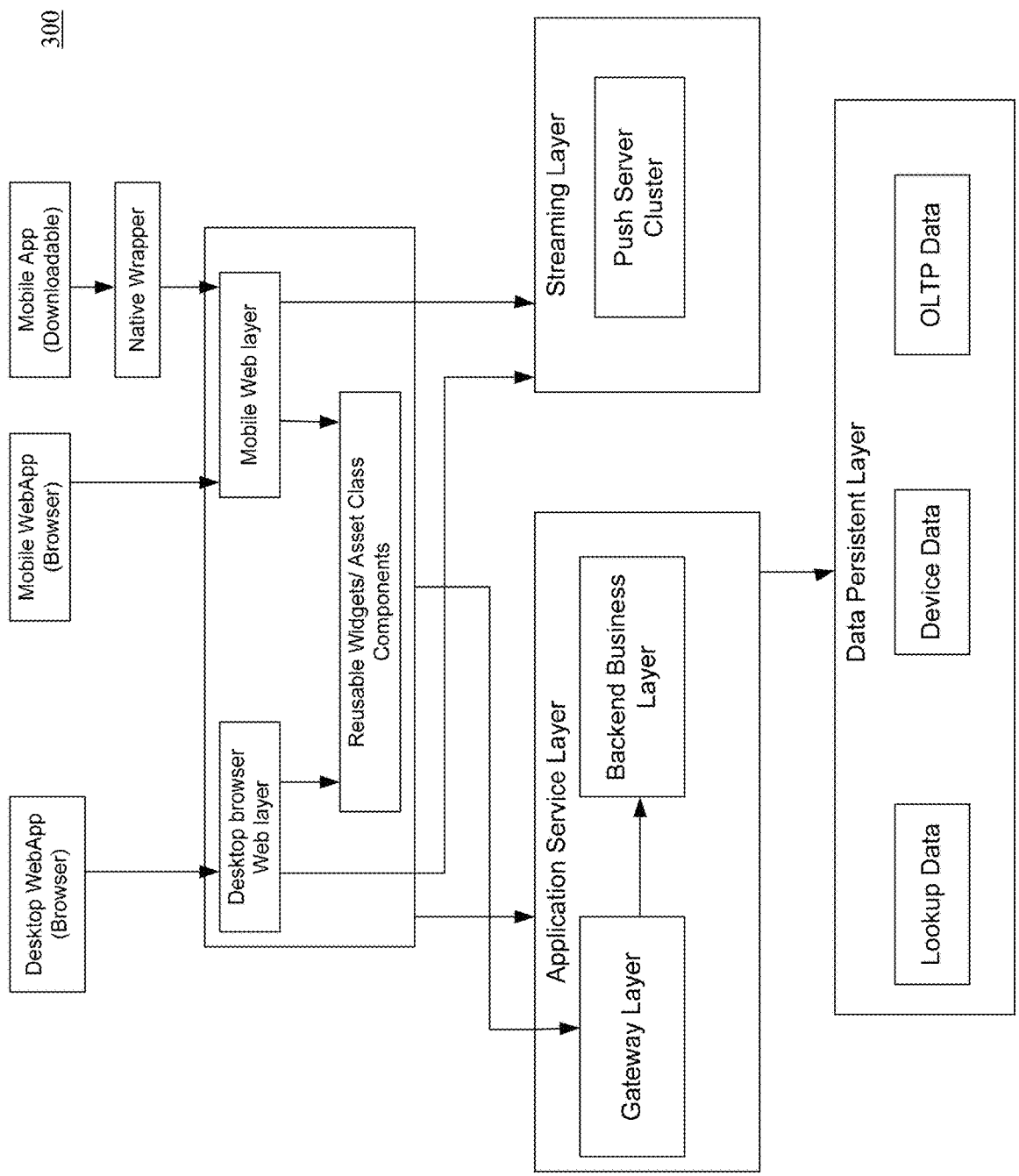
FIG. 3 depicts a block diagram of an exemplary logical implementation of the system of FIGS. 1 and 2.

The mobile gateway 108 may be logically implemented as depicted in FIG. 3 which depicts a logical implementation of the system of FIGS. 1 and 2. In particular, FIG. 3 shows an overall structural topology of the different layers over which the platform, which includes the mobile gateway 108, is divided, collected and catered to provide services 106 to the devices in 104, as well as other devices, such as desktop computers. FIG. 3 also shows the web layer and UI components and illustrates the data interactions there between. In particular, the presentation layer on the web or application receives data from the Application Server Layer, e.g. the mobile gateway 108, servers 106 and/or push server(s) 114, as well as the Streaming Layer implemented by the mobile gateway 108 and/or push server(s) 114. Each of the Application Server Layer and Streaming Layer may receive data from the data persistent layer which may consist of lookup data, device specific data to classify and identify devices as well as any transaction specific data stored in the database.

It will be appreciated that the mobile gateway 108 may comprises one or more computer systems 1500 described below with respect to FIG. 15, and may perform a variety of functions focusing on different aspects between the mobile device 104 and the service providers/business backend servers 106, including balancing resource utilization between devices and servers, acting as a key component which may facilitate scaling up and building mission critical applications, such as mobile financial trading applications, that can match up to the standards of a desktop or web based trading application. The mobile gateway 108 may assist in catering to various runtime service/user interface presentations by performing intelligent functions such as device detection, collection of device parameters, execution of a rules engine, executing dynamic computation models etc. The mobile gateway 108 may implement an intelligent layer of communication between the mobile devices 104 and the services/servers 106, i.e. the business backend, and may be implemented that all communications between the devices 104 and the services/servers 106 flow through the mobile gateway 108 or, alternatively, such that the mobile gateway 108 may be privy to all such communications. As will be described below, the mobile gateway 108 may include components or sub-systems which implement dynamic presentation 400, dynamic execution 1100 and/or dynamic data communications as will be further described in more detail below.

For example, as will be described in more detail below, the mobile gateway 108 may, using the dynamic execution sub-system 1100, may automatically determine whether various work (computation, data caching, transaction validation etc.) for a mobile application should be performed on the mobile device 104 itself or elsewhere, such as on the server 105 or on the mobile gateway 108, to which the device 104 is connected. The decision may be based upon the type of mobile device 104 and its available network and/or hardware capacity, or any other resources, as was described above. For example, a device 104 with sufficient CPU capacity may be determined to perform profit/loss ("P&L") calculations locally. In contrast, a device 104 with inadequate CPU capacity may have the P&L calculations performed by the server 106 and the results sent, i.e. pushed via the mobile gateway 108 and/or push server(s) 114, to the mobile device 104 for display. If the mobile application needs to cache some data, such as security symbols, the mobile gateway may determine if the device has sufficient disk or other storage capacity for the cache and, if not, the data may be cached in storage provided by the mobile gateway 108. These determinations can be changed during a connection session and/or upon the next connection if the particular resource capacity changes, perhaps due to the number of other applications running on the device, as will be further described below.

In addition, the mobile gateway 108, utilizing the dynamic presentation subsystem 400, may also determine the different presentation layers that are required for working efficiently on different devices. The sub-system 400 may include a presentation logic/rules engine, stored within the gateway 108, which determines various device 104 capabilities, and available portions thereof, such as based on:

Class/capabilities of device 104, e.g. size, resolution, CPU speed, memory characteristics, user interface type (touch, non-touch). Devices 104 may be placed into categories, e.g. small, medium, large or high, medium, low, based upon their physical and technical characteristics.

Utilization diagnostics, e.g. how much of the device's 104 memory, CPU power, storage, network bandwidth is currently available for the particular service/application; and/or User specified parameter values, e.g. the user may specify not to use the 3G network to save on costs, so the dynamic presentation layer will be adjusted to reduce bandwidth requirements.

In one embodiment, components of the user interface may be cached or otherwise stored on the device for later re-use, without having to retransmit the components. In such an implementation, principals of temporal and/or spatial locality may be implemented so as to provide additional components, determined to be likely to be needed, in advance to store in the cache so as to provide ready access in order to improve performance. Suitable cache updating and maintenance routines may further be implemented to manage this storage and maintain coherency with server.

The gateway 108 may, as may be described, may facilitate one or more of the following:
Session Management
Device Recognition
Dynamic Presentation logic and asset loading
Dynamic computation model
Offloading client-side business logic
Hosting mobile web content
Logging
Caching of static data
Security
Optimizing communication between device and Backend logic or combinations thereof.

Overall the gateway 108 may enrich the mobile application, making it similar to a desktop-like experience dealing with various enterprise level aspects of a traditional desktop web application.

In particular, as will be described in more detail below with respect to FIG. 4, a system 400, which, as described, may be a subsystem of the mobile gateway 108 or otherwise implemented separately therefrom, may be provided for dynamically provisioning a user interface to a device 104 to facilitate access to a service 106 by a user thereof. The system 400 may include a non-transitory memory 404, which may be volatile or non-volatile and may be implemented as the memory 1504 described below with respect to FIG. 15, having computer executable instructions 406, 408, 410, 412, 414 stored therein. The computer executable instructions 406, 408, 410, 412, 414 may be executable by a processor 402, which may be implemented by the processor 1502 described below with respect to FIG. 15, to cause the processor 402 to receive a request from the device 104 to access the service 106, identify, based on the request, at least one capability of the device 104 and a currently available portion thereof, determine a set of user interface components, each of which is operative to facilitate access to at least a portion of the service 106 and which is optimally executable by the device 104 within the available portion of the at least one capability, assemble the set of determined user interface components into the user interface and provide the user interface to the device 104 whereby the user may utilize the user interface to access the service 106.

Figure 9:
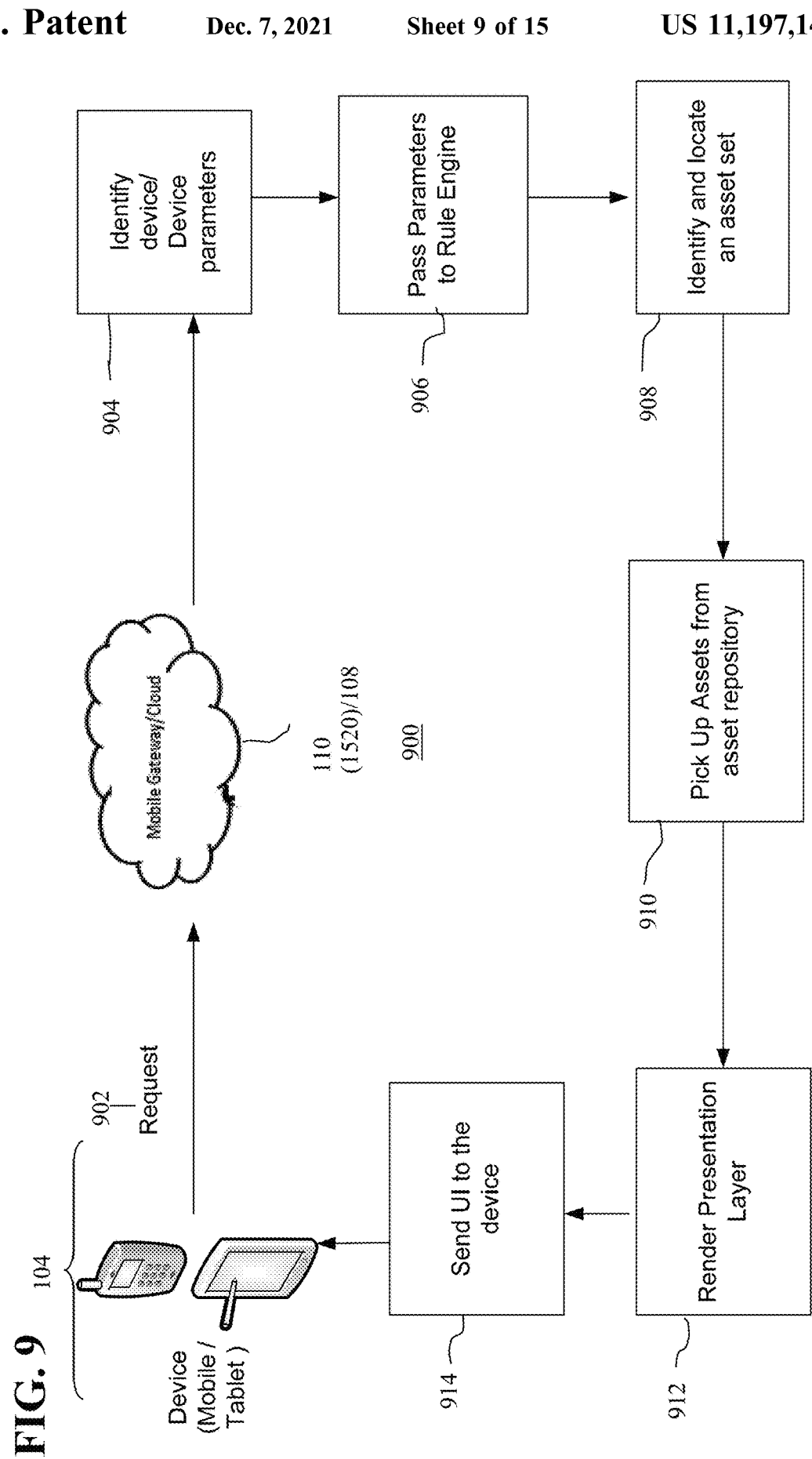
FIG. 9 depicts a flow chart showing exemplary implementation of the operation of the system of FIG. 4.

Generally, as shown in FIG. 9, the system 400 builds the presentation layer, e.g. the user interface, of a mobile application at runtime. The user interface, i.e. the way the application looks and the features presented may be different depending upon the:

1. Class of device 104, e.g. size, resolution, CPU speed, memory characteristics, user interface type (touch, non-touch), mobile service provider, operating system, or other characteristic described above. Devices may be placed into categories, e.g. small, medium, large or high, medium, low, based upon their physical and technical characteristics;

2. Utilization diagnostics, e.g. how much of the device's 104 memory, CPU power, storage, network bandwidth is currently available for this application; and/or 3. User specified parameter values, e.g. the user may specify not to use the 3G network to save on costs, so the dynamic presentation layer will be adjusted to reduce bandwidth requirements.

All of the rules related to the dynamic presentation layer may be executed at runtime, such as from a single code base which enables the mobile application to present the optimum set of features for each device, depending upon both its inherent characteristics and the dynamic changes in its environment.

Figure 6:
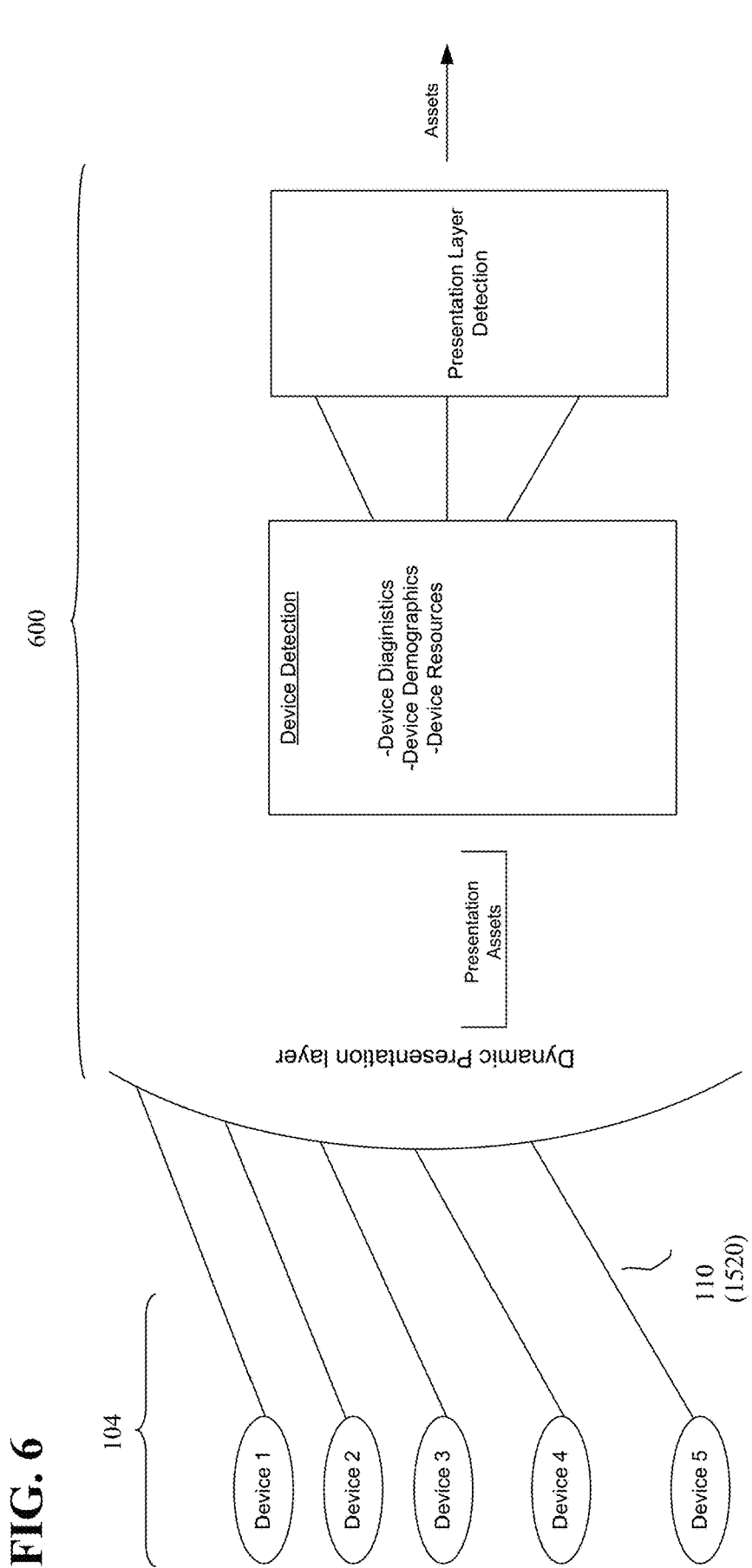
FIG. 6 depicts a block diagram of an exemplary implementation of the system of FIG. 4.

As shown in FIG. 6, the system 400 may include a software framework 600, also referred to herein as device diagnostics, that detects the type of mobile device 104 (screen size, resolution, processor speed, memory, available storage, operating system etc.) and automatically adjusts the number and types of user interface components/features, also referred to as widgets, to be displayed on the device 104. For example: a high-resolution tablet device 104 may have the most feature-rich price chart widget enabled; A low resolution device 104 with a larger screen may have a simple price chart widget; a low resolution device 104 with a small screen may not have the price chart widget at all. Another example: a mobile device 104 lacking a touch screen may receive a substantially different UI than a touch screen-based device 104. Each widget may have several different configurations from which to select, depending upon the category of mobile device, thereby enabling similar functionality in different variations appropriate for different devices 104. This may all be implemented, for example, within a single HTML5 mobile application.

In contrast, current mobile applications may be implemented on either native platforms or web-based applications accessible via a device's 104 web browser application. However, with the advent of more front-end technologies like HTML5, it became easier to implement mobile web based applications which could be accessed by different devices. However, such solutions do not address the issues of the applications being used by different devices having different capabilities. As a result, companies may have to implement a lot of patches on their application code to enable the code to work on the different devices or build separate instances of the application completely for different devices. The disclosed embodiments solve this problem and introduce a new concept that, based on different factors, like class of device 104, utilization statistics or parameters, a view of the mobile application can be generated and presented to the user completely at runtime.

The disclosed embodiments may enable the following advantages/improvements:

- Reduction of software development (effort and/or costs) required to support different classes of devices 104 and/or different types of browsers programs and/or operating systems. Instead of building different applications for different devices or writing generic code, the disclosed embodiments add a layer that can utilize the same core software but can render and cater to different devices 104 based on parameters detected at runtime.
- Increased efficiency and usability of the users with different devices 104 to work on a user interface that is meant and designed for that device 104. Further, as parameters of the device 104 change or otherwise vary, the disclosed embodiments facilitate adaptation by the user interface to such changes without having to make other changes thus providing a seamless experience to the users and giving them optimal experience and satisfaction.
- Increased application performance due to optimization of the user interface based on several parameters and utilization statistics which are all monitored at runtime. User interfaces can be resource intrinsic and hence the requests coming for different screens or modules may first be processed by the gateway/middleware 108 and combined with a user interface that the device 104 can handle, improving reliability and responsiveness.
- Addition of flexibility to have an application functionality to be extended to new devices 104 coming in the market with minimum changes without the time and effort required to build an application geared towards that device 104.

Figure 7:
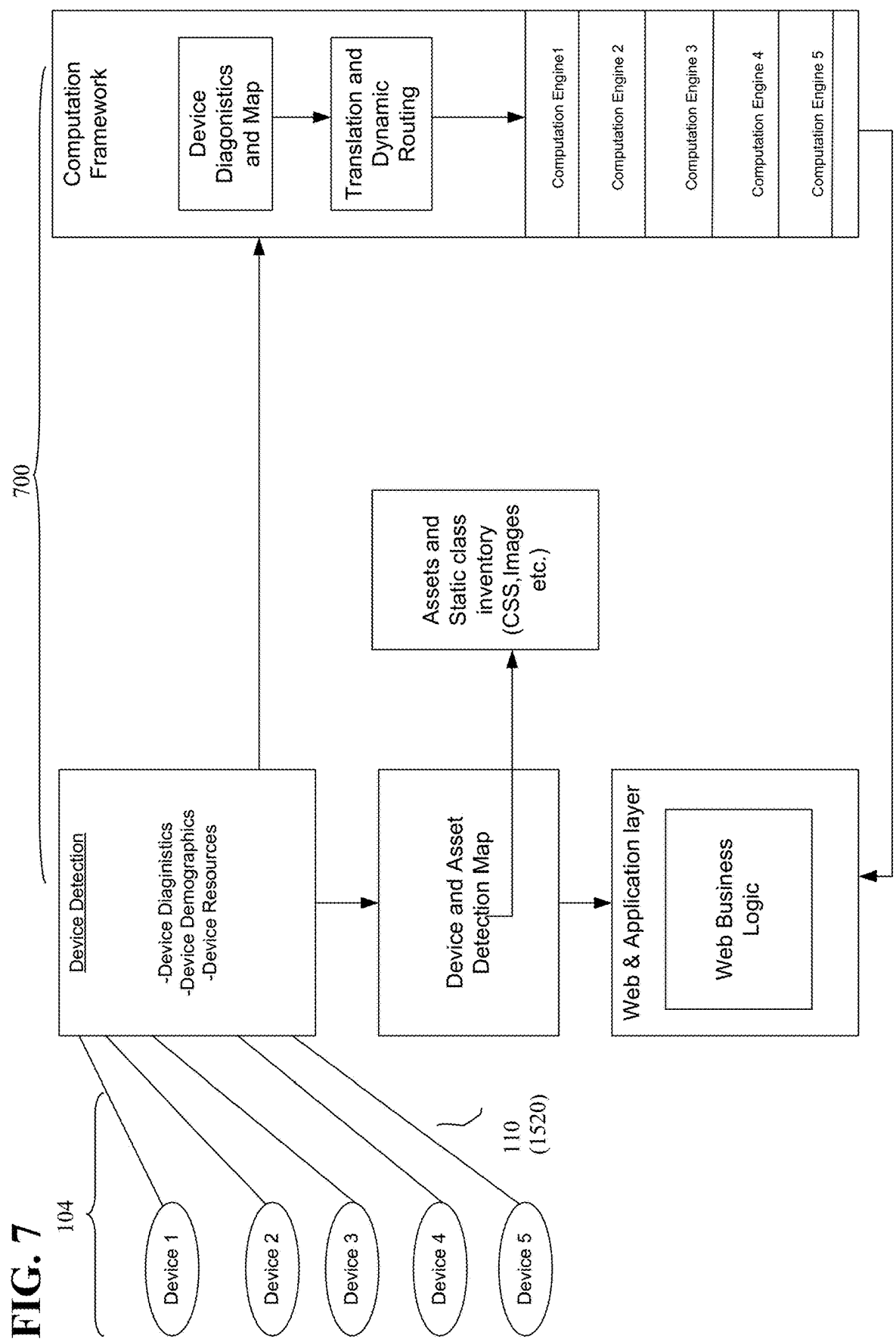
FIG. 7 depicts a block diagram of an exemplary device detection mechanism for use with exemplary implementation of FIG. 6.

FIG. 7 shows a block diagram depicting one implementation of the system 400 for implementation of a dynamic presentation layer as described above. The diagram shows layer aspects and the logical flow of communication between mobile devices 104 and how the presentation layer which is displayed to the user is ultimately customized provided to the device 104.

In particular, requests made from the different devices 104 pass through a device detection layer to identify and classify the type of device. The device detection layer is further mapped to the device and asset detection layer where the assets, e.g. user interface components or widgets, to be downloaded are determined depending on the classification of the device 104 and is also mapped to the computation framework where depending on the type of the device it selects one of the computation models as described below. Once the assets to be downloaded and the computation framework are selected the web application layer applies the business logic and renders the response to the device 104.

Figure 8:
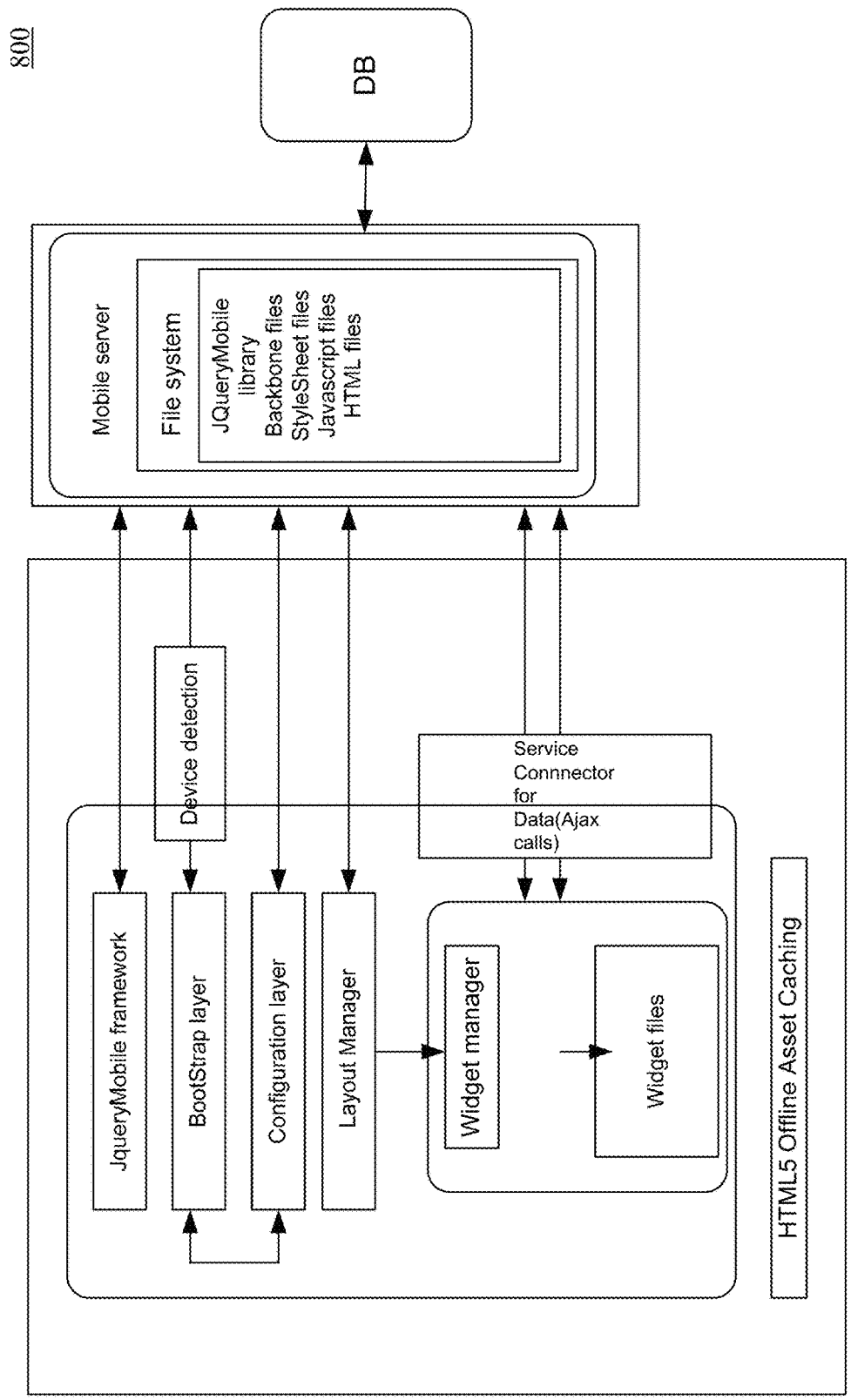
FIG. 8 depicts a block diagram of an exemplary implementation of the system of FIG. 4.

FIG. 8 shows a block diagram depicting the User Interface aspects of the dynamic presentation layer described above. The diagram represents how the offline caching of assets help to load the presentation layer and data faster on the mobile device 104. The diagram further illustrates the various logical layers of communication between the device 104 and the loading and storing of data on the device 104.

In particular, a request may be made from the device 104 to the server 106 to fetch a list of results. The device may then go through a device detection layer so that the type of device 104 may be classified and the response received, is rendered on the fly. The response may either be cached so that next time that data or the presentation asset is needed, if it is cached it can be shown immediately, and continue with the other request on the background, updating the interface when a response is received.

Figure 10:
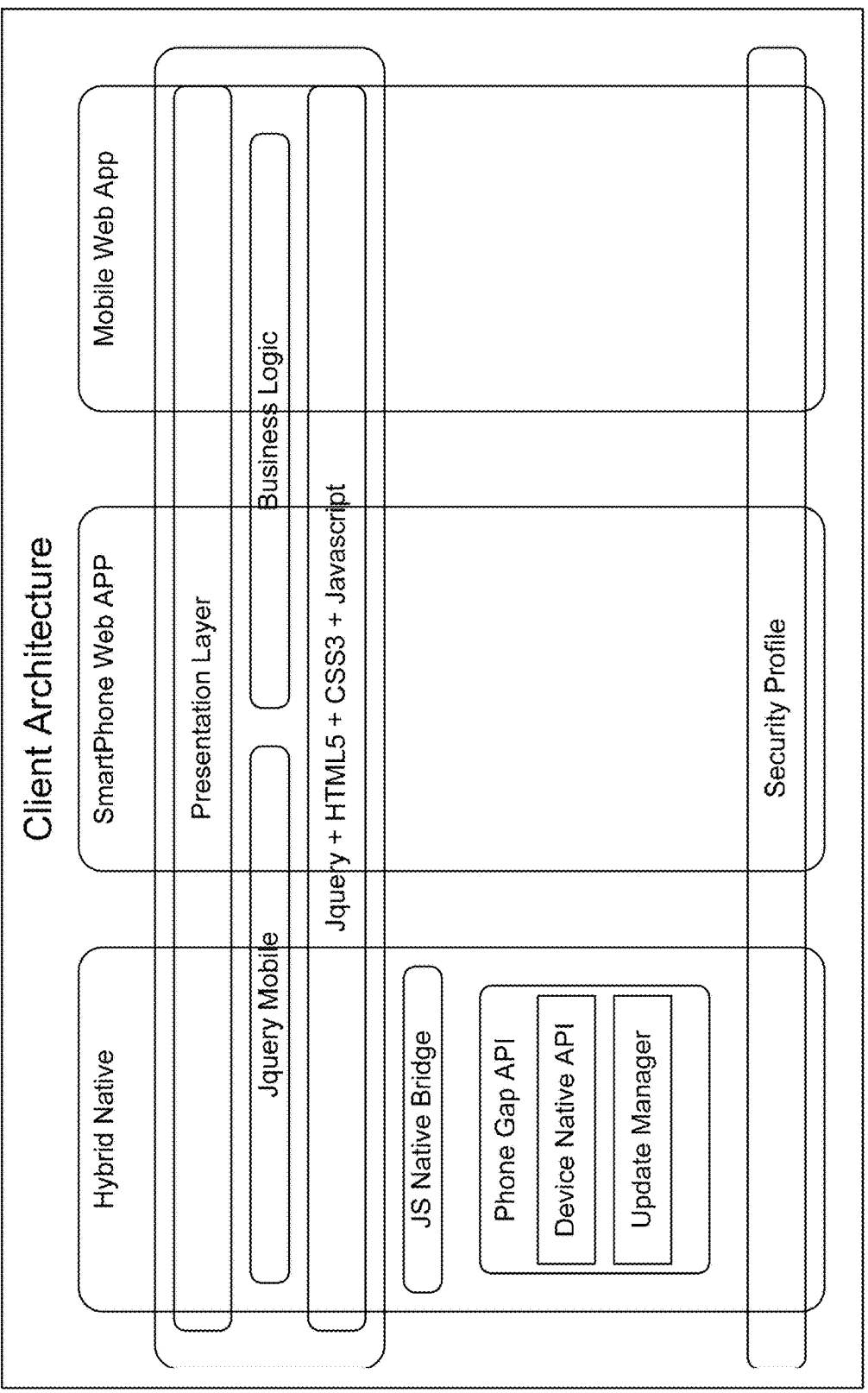
FIG. 10 depicts a block diagram of an exemplary client application architecture for use with the disclosed embodiments.

FIG. 10 shows another block diagram illustrating a client architecture for use with the system 400 showing how the same presentation logic may be rendered on all different mobile platforms, i.e. how the same application will be portable on all the devices 104. The presentation layer logic, as described herein, may be executed at runtime, from a single code base which enables the mobile application to present a set of features for each device 104, depending upon both its characteristics and the dynamic changes in its environment. It allows for leverage of the same architecture to build downloadable web, native and hybrid applications based on the specific business needs.

In particular, as will be described below with respect to FIG. 11, a system 1100, which as described above, may be a subsystem of the mobile gateway 108 or otherwise implemented separately therefrom, may be provided for provisioning of a service 106A by a server 106 to a client device 104, the service 106A being based on execution of a plurality of computations. The system 1100 may include computer executable program code 1106, 1108, 1110, 1112, 1114, 1116 stored in a non-transitory memory 1104, which may be implemented by the memory 1504 described below with respect to FIG. 15. The computer executable code may be executable by a processor 1102 coupled therewith, which may be implemented by the processor 1502 described below with respect to FIG. 15, to cause the processor 1102 to receive a request from the client device 104 for the service to be provisioned thereto, determine a currently available capacity for the client device 104 to execute the plurality of computations and apportion, based on the determined currently available capacity, the plurality of computations among the client device 104 and the server 106, or other intermediary device, such as the mobile gateway 108, push server(s) 114 or other server, for execution thereby, wherein a result of the portion of plurality of computations executed by the server 106 or other intermediary device, such as the mobile gateway 108 or push server(s) 114, is provided to the client device 104 for aggregation with a result of the portion of the plurality of computations executed by the client device 104, the aggregate result being presented to a user of the client device 104.

As will be appreciated, statically defining where computations will occur, e.g. on the client or server (or other intermediary), may limit the flexibility to optimally distribute the computational load at the time of execution based on the currently available resources so as to provide the optimal user experience. Furthermore, creating multiple implementations of an application having different computational configurations consumes resources, both for development and maintenance, which might otherwise be devoted to further development. Diverting computations to devices 104 which can handle them maintains the user's expected level of service while reducing the burden on the server 106, or intermediary 108/114, which may then devote its resources to supporting and providing an expected level of service to devices 104 of limited capability. Device side execution further conserves communications bandwidth and improves reliability (a dropped connection will not prevent delivery of the result).

Generally, it will be understood that mobile devices 104 normally come with limited processing powers and capabilities. In particular, it will be appreciated that for as much that the performance of a mobile device 104 may improve, such performance will generally lag behind the performance of non-mobile devices, such as the server 106 or intermediaries 108/114, which are not necessarily constrained by power or size. Accordingly, many high end functionalities or computations easily handled by a desktop based application may not be implemented on mobile devices 104 and, therefore, traditionally such features have not been available to mobile devices 104.

The disclosed embodiments determine computation-based functionalities at runtime for execution either on the device 104, the server 106 (or other intermediary), or a combination thereof, based on several device diagnostics parameters such that the computation can be done efficiently and seamless to the device and thus enriching optimal user experience. The disclosed embodiments generally solve the problem of providing a similar functionality on both low-end or a high-end devices 104 based on the capability of the device 104 and hence solves a traditional problem of sticking to either a client based computation approach or a server based computation approach, where there is no flexibility at runtime to switch based on what is the processing capability of the device 104 itself.

In particular, mobile applications, such as those utilized for trading, generally lack the high-end trading or financial computations which involve streaming data because these computations are computationally resource intensive. Instead, these computations may be performed exclusively by the server 106, or other intermediary, with the results then delivered to the device 104. As will be appreciated, the existing solutions do not provide the flexibility of catering to changing conditions of the device or the type of device and how the computation may be performed. Instead, a similar computation methodology is implemented across all devices 104 either on the device side or on the client side, leading to performance problems or limiting such functionalities provided to the users of those devices 104.

The disclosed embodiments may allocate or otherwise apportion computations according to three different paradigms:

a) Device computation paradigm: The computation logic is executed within the device 104. The code is downloaded onto the device 104 itself and the computation is done at the device level. The files and code for executing such a computation may always be downloaded to the device 104 and only invoked if this paradigm is chosen;

b) Server computation paradigm: The computation logic is executed at the server 106, or other intermediary such as the mobile gateway 108, in the backend. The request for such a computation comes from the backend and once the results are computed, they are pushed back or otherwise communicated to the device 104; or c) Hybrid computation paradigm: Some parts of the computation are performed on the device 104 and other parts are performed on the server 106 or other intermediary such as the mobile gateway 108.

In one embodiment, an application may be divided into different widgets or components, of which some may implement underlying computations. Computation logic to select either of the above three paradigms for apportion of the computations among the device 104 and server 106 (or intermediary) may include rules which consider:

1. Class of device, e.g. size, resolution, CPU speed, memory characteristics, user interface type (touch, non-touch);
2. Utilization diagnostics, e.g. how much of the device's memory, CPU power, storage, network bandwidth is currently available for this application; or
3. User specified parameters provided by the user to override or otherwise direct the apportionment of the computations to the device 104, server 106 or a combination thereof.

In one embodiment, the system 1100 may continually reevaluate these factors. On the first instance, when a widget is invoked for computation, the system 1100 may check for these parameters and decide, such as based on certain rule, stored for example, in a table or database, which mode/paradigm of computation is appropriate. The result may then be sent to the client-side device code, and/or the server 106 or intermediary, and the computation is executed henceforth.

At runtime, certain of the factors described above may be monitored at the device 104 and the same widget which was computing using a paradigm either of a, b or c can switch to a different paradigm based on how the utilization diagnostics may have changed. For example, where a user was using an iPad and had the mobile application open and a widget was initially using computation module a, but then if the user subsequently opens multiple additional applications, thereby reducing the amount of available resources at runtime, the computation can be switched to paradigm b or c. At the same time, if in the same mobile application the user simultaneously selects another widget to view which has computation, and originally, it was to return a paradigm a, it can return b or c based on the changed device utilization diagnostics.

Hence the disclosed embodiments create a dynamic model of computation within mobile applications switching to the different models to have optimal user experience and supporting mission critical financial computations required in the trading platforms.

The advantages imparted by the disclosed embodiments may include:

Making critical computation logic for trading applications (streaming/non-streaming) available to users in a mobile web-based platform;

Improving performance and speed of the mobile web application such that the application does not get slow or hangs just for executing a heavy computation;

Reducing software costs for building different device specific/native applications for providing computational functionalities to users in mobile; and/or Enabling the same functionalities that customers are used to in a desktop environment to be offered in a mobile environment.

In particular, as will be described below with respect to FIG. 13, a system 1300, which as described above, may be a subsystem of the mobile gateway 108 or otherwise implemented separately therefrom, may be provided for dynamically managing utilization/consumption of communication bandwidth, or other device capability, as described above, either the maximum possible or that which is presently available, between one or more data sources, which may include any data originator or any intermediary devices or other re-transmitters thereof, such as a server/service 106, and a receiving device 104, e.g. the device 104 executing at least one application operative to receive data from the data source 106, such as a mobile device 104. The application may be a computer program, such as a user interface or component thereof, e.g. widget, operative to perform a function with respect to the received data, such as present the data via the device to the user, receive input from the user relative thereto, process the data, such as to compute or otherwise derive a value therefrom, alone or in combination with other data, or combinations thereof. It will be appreciated that more than one application may be executing on the device 104, such as multiple user interface components/widgets, or multiple separate applications, etc. Each application or widget may receive its own different stream of data from the same or a different data source. Alternatively, or in addition thereto, more than one application/widget may receive the same data stream from the same data source. The data may include a plurality of data/data items transmitted over a period of time, e.g. a data stream, wherein, for example, each data item may include content which is, or becomes, available for transmission at a particular time, such as financial market price data or other data generated based on the occurrence of events, etc. The system may include computer executable code or logic 1306, 1308, 1310 stored in a non-transitory memory 1304, which may be volatile or non-volatile and may be implemented as the memory 1504 described below with respect to FIG. 15, and executable by a processor 1302, which may implemented as the processor 1502 described below with respect to FIG. 15, to cause the processor 1302 to monitor, during the period of time over which the data is being transmitted, e.g. continuously, at intervals, or otherwise substantially in real time with respect to the data transmission, utilization of the at least one capability to determine an available portion thereof, or alternatively the unavailable portion, and cause, based on the determined available portion of the at least one capability of the device 104, at least one of the plurality of applications to cause the data source to modify the transmission of the associated plurality of data to the device. The system may be implemented in the device 104 or separate therefrom such as in the mobile gateway 108 or other intermediary as described above. In this manner, the transmission of data from the data source is indirectly managed by controlling the consumption of that data by the applications/widgets which are receiving the data. As will be described, applications/widgets may receive data from a data source by establishing a subscription or otherwise registering with the data source. The subscription/registration may define the type/format of the data, the rate of transmission, the volume of data, the time period over which to send the data, the mode of transmission, e.g. push or pull or rate thereof, or other parameters. The system may cause the application to modify the transmission of data, as described, by, for example, causing the application to alter one or more parameters of the subscription/registration.

As described above, the at least one capability of the device may include display size, display resolution, available output devices, available input devices, available geo-locating device, communications capability, power capacity, processing capacity, operating memory capacity, storage capacity, or combinations thereof.

In one exemplary implementation, the computer executable program code may be further executable by the processor to cause the processor to determine that the available portion of the at least one capability has decreased and, based thereon, cause at least one of the plurality of applications to cause the data source to limit the transmission of the associated plurality of data to the device. For example, the computer executable program code may be further executable by the processor to cause the processor to cause the at least one of the plurality of applications to cause the data source to reduce the rate at which the associated plurality of data is transmitted to the device, to reduce the amount of the associated plurality of data which is transmitted to the device, to cause the data source to transmit the associated plurality of data to the device only upon request therefore, e.g. switch from push to pull, conflate or otherwise combine data into less frequent transmissions, or combinations thereof. It will be appreciated that as the available capacity changes, the processor may cause the application to further adjust the transmission of data. For example, if the available bandwidth should increase, the rate of transmission may be increased.

In one exemplary implementation, the computer executable program code may be further executable by the processor to cause the processor to receive, from the user of the device, a specification, e.g. a user preference or selection, of an extent to which at least one of the plurality of applications can be caused to cause the data source to modify the transmission of the associated plurality of data to the device, the computer executable program code being further executable by the processor to cause the processor to cause, based on the determined available portion of the at least one capability and the specification, the at least one application of the plurality of applications to cause the data source to modify the transmission of the associated plurality of data to the device.

It will be appreciated that different applications/widgets may be configured, statically or dynamically, by the user and/or the provider of the application/widget or otherwise based on some other parameter, with a designated capacity threshold or priority which the system may consider when determining to cause modification the data transmission thereto as described. This facilitates operation of applications which, for example, may be less tolerant to lower transmission rates because, for example, the data may comprise critical information having a limited time of relevance where delay may undermine the relevant nature thereof. For example, when trading volume is significant, or otherwise price volatility is high, the market data may be rapidly changing necessitating provision of market updates to a data display application/widget with minimal delay to ensure the user is privy to the most up to date data. When trading volume drops, the transmission rate or update rate may be lowered as the market data may be changing less frequently.

In one embodiment, the server 106 may be caused by the application to selectively inhibit transmission of a particular data item upon availability thereof when the available bandwidth between the data source 106 and the receiving device 104 does not exceed a threshold, determine if the content of the inhibited data item is identical to the content of a previously inhibited data item or identical to the content of the next data item to become available and, if identical, deleting the inhibited data item and, if not identical, transmitting the inhibited data item. In this manner, data items in a data stream are selectively dropped when the available communications bandwidth falls below a threshold. This ensures that the most current data is able to be communicated to the device 104.

The disclosed embodiments recognize that it may be difficult to stream data to mobile devices 104 as wireless media places a limitation on the amount of data that can be streamed to the devices 104, both in terms of absolute limits on volume as well as costs. While it may be generally considered that such issues are irrelevant with respect to wired devices, it will be appreciated that the disclosed embodiments may be applicable to any communication medium for which the available bandwidth is less than the amount required to facilitate access to the service 106 or where the costs thereof are not insignificant. Most of the financial trading applications, specifically mobile web applications, have suffered from problems where only limited functionality can be presented on the devices 104 because of lack of efficient ways to stream data over limited network resources. Furthermore, streaming data and the computations related to handling it are very resource intensive and may introduce heavy computational loads on the devices 104. The disclose embodiments address these issues by dynamically adjusting data rates, volumes or modes of transmission, e.g. push or pull or rate thereof, based on various networking, data and device diagnostics.

Solutions for push server methodologies are available that detect network bandwidth and conflate data or push data accordingly. This is at a different layer than the mobile device. This is done at the push server layer mentioned in 108 where generally a persistent connection between the browser/device is established with the push server and then network bandwidth is detected to conflate data. However, these solutions fail to dynamically facilitate steaming data and computations on the device 104 and cannot efficiently handle dynamic updates.

The disclosed embodiments are implemented as a software system 1300 which may be used to send high volumes of data, such as securities market data, to devices 104 connected via mobile and wireless networks. This system may be implemented on the mobile server (gateway) 108 to which, for example, thousands of mobile devices 104 may be connected. The system 1300 may frequently detect the network capacity available to each mobile device 104 and automatically adjust the amount of data being sent to each device 104 based upon, for example, the available network throughput. If the capacity declines below a defined threshold level, the system 1300 may further dynamically remove certain functional capabilities of the mobile application to lower the amount of data the mobile application can request.

As discussed above, the functionalities that are available in the mobile app may be in the form of widgets or components of a user interface ("UI"), and one or more of the UI widgets/components may feature streaming data that is pushed to the device from, for example, the mobile gateway 108 or the servers/services 106. When various factors change, such as a different type of device 104 is accessing the service, the number of active widgets/components changes, or the data connection or network speed varies, the system 1300 automatically detects the current conditions, or changes thereto, and may modify the streamed data, vary the speed at which data is streamed, and/or change from a push to a polling methodology.

For example, when the network throughput changes, the system 1300 may perform any combination of the following based on optimal conditions that it analyzes:

Switch from an active subscription to a passive subscription, e.g. less frequent transmission of up to date data, for streaming data;

Slow the rate at which data for any one or more widgets/components is pushed to any one or more of the mobile devices 104;

Vary the rate that data is pushed among multiple active widgets/components; Different widgets can have different rate of updates;

Selectively switch some widgets/components from a push methodology to a polling or slower update methodology; and/or Allow the user to prioritize which widgets/components should receive updated data as quickly as possible and which can tolerate delayed/periodic updates.

The disclosed embodiments improve usability for the user so that even with limited bandwidth, the user can still receive updates from the market and make intelligent trading decisions. For example, the disclosed embodiments enable users to stay connected and receive updates even when a sudden switch in network connectivity occurs, for example when the connection transitions from Wi-Fi to a 3G network, etc. The disclosed embodiments may further improve speed and reliability as under normal circumstances, such as where streaming data applications are not currently being used by the user and the user may choose at what rate and speed they want the mobile application to stay updated. Furthermore, by streaming data or polling when necessary, the disclosed embodiments may enable a new style of mobile applications which even customers with low bandwidth can afford.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 4:
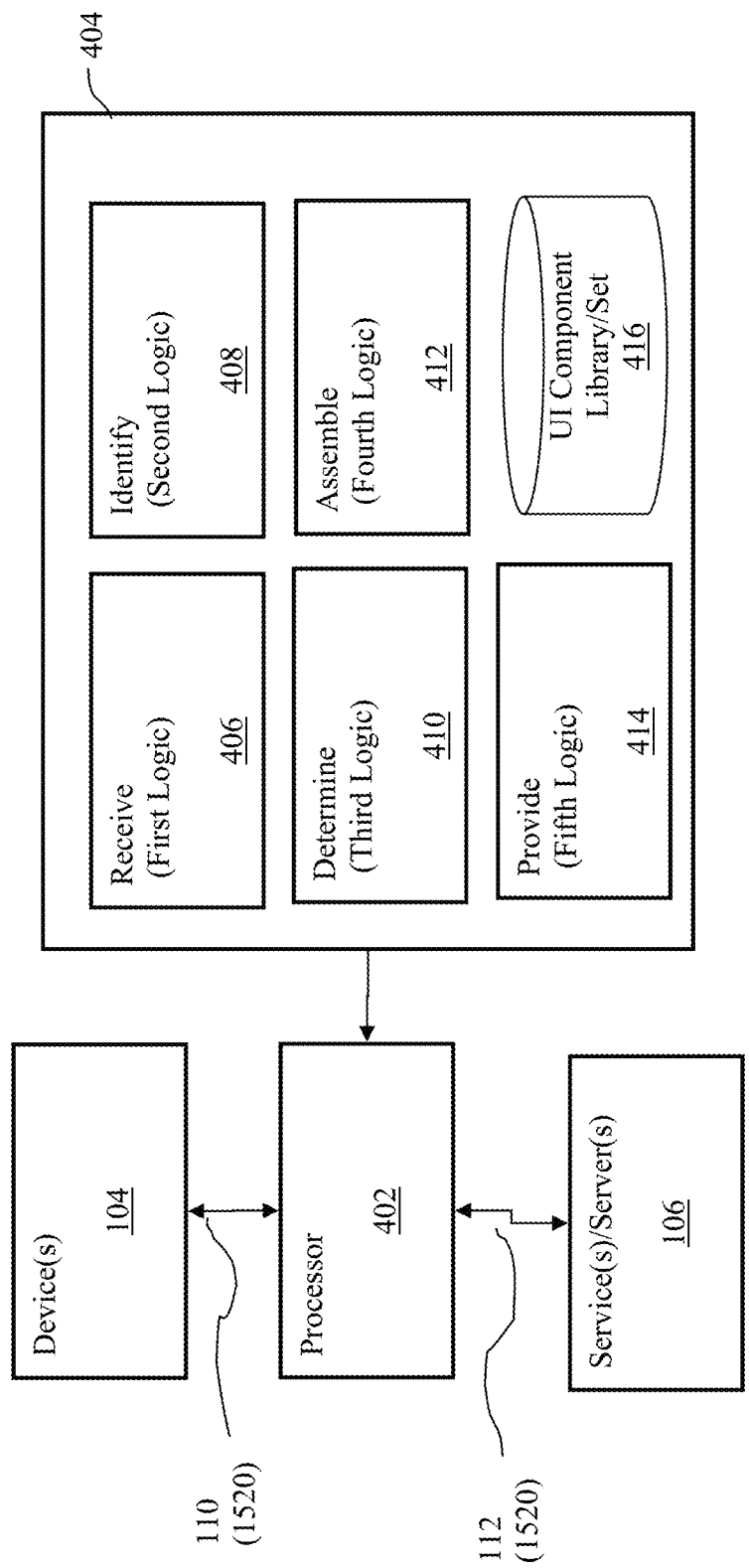
FIG. 4 depicts a block diagram of an exemplary implementation of a system for dynamically generating a user interface for facilitating access to a service for use with the system of FIGS. 1 and 2, according to one embodiment.

FIG. 4 depicts a block diagram of a system 400 for dynamically provisioning a set of functions to a device 104 to facilitate access to a server, and/or service provided thereby, 106 by a user thereof. In one embodiment, the system 400 may be a subsystem of a mobile gateway/intermediary 108, as was described above, which facilitates communications between the server/service 106 and the device 104. The device 104 may be a mobile device 104, such as a smart phone, cellular phone, tablet computing device, laptop computer, etc., which accesses the service 106, at least in part, via a wireless connection, e.g. Wi-Fi, 3G, 4G, etc., as was described above. The service 106 may comprise a financial trading/data service via which a user may have access to market data, as well as market data analysis tools/functions, and via which the user may place orders to trade financial products and view the results thereof. The set of functions may be comprised of a user interface ("UI") where in each function is provided by a component/widget thereof which may implement a graphical representation and interact with various input and output mechanisms of the device 104 to receive input from the user and/or present output thereto, as well as interact with the service 106 to convey data, such as the received user input, thereto, and receive data from, such as market data, computational results, etc., therefrom, for presentation to the user or otherwise. It will be appreciated that the service 106 may be implemented at a server remote from the device 104 where the UI merely acts as a conduit to receive input from the user and provide that input to the remote service, as well as receive data from the remote service and present that data to the user. Alternatively, one or more aspects of the service 106 may be implemented locally on the device 104 and provide the device 104 with the UI, wherein the UI facilitate access to the one or more locally implemented aspects of the service 106. In one embodiment, the UI component may be integrated with the service functionality to which access is facilitated thereby. As will be described further below, the determination of which aspects of the service 106 are provided remotely and which may be provided locally on the device 104 may be dynamically determined at the time the user requests access to the service 106.

The system 400 includes a processor 402 and a memory 404, such as a non-transitory volatile or non-volatile memory, coupled therewith which may be implemented by the processor 1502 and memory 1504 as described below with respect to FIG. 15. The system 400 further includes a set, i.e. a library or database, of user interface components 416, which may be referred to as elements or widgets, stored in the memory 404, subsets thereof being operative to implement at least one of the set of functions to facilitate access to at least a portion of the service 106. Such components may implement menu's, selectors, data input fields, graphical displays, textual displays, or combinations thereof. It will be appreciated that nature of, and functions implemented by, user interface components may vary and that any such components which facilitate interaction with the user, the device 104, the surrounding environment, or a combination thereof, are contemplated herein. Each of the set of user interface components 416 may be implemented as a computer program executable, or otherwise renderable, by the device 104, and further characterized by at least one requisite capability of the device 104 necessary for optimal execution/rendering thereof by the device 104. That is, each component may be tailored to a particular capability. For example, a component tailored to a high resolution screen may include high resolution graphical elements. A component may be tailored to touch screen input, featuring large graphical buttons, etc. UI components may be provided which provide access to the same service but which are tailored for different device 104 capabilities, e.g. one for low resolution graphics, one for high resolution graphics, one for touch screen input, one for keyboard based input, etc. Other variations include variations in the methodology of communication, e.g. push vs. pull.

The capabilities, also referred to as attributes, features or specifications, of the device 104 may include display size, display resolution, available output devices, e.g., visual/display, audio, vibration, LED indicators, device communications, such as Bluetooth, available input devices, e.g. keyboard, touch screen or pad, voice, optical/camera, physical/accelerometer/proximity, thermal, pressure, RFID, NFC, Bluetooth, available geo-locating device, e.g. GPS, aGPS, communications capability, e.g. cellular radio (CDMA, GSM, 3G, 4G), Wi-Fi (a, b or n), cellular service level (unlimited, capped), SMS/MMS, Bluetooth, NFC, power capacity, e.g. operating off a battery or plugged in, processing capacity, operating memory capacity, storage capacity, or combinations thereof.

The system 400 further includes first logic 406 stored in the memory 404 and executable by a processor 402 coupled therewith to cause the processor 402 to receive a request from the device 104 to access the service 106, the device 104 being characterized by at least one capability and a currently available portion thereof. The request may be received in the form of a log in to the service 106, selection of a uniform resource locator, or execution of an application program loaded on the device 104 which then initiates communication with the service/server 106, such as via the mobile gateway 108.

The system 400 further includes second logic 408 stored in the memory 404 and executable by the processor 402 to cause the processor 402 to identify, based on the received request, e.g. at run time or otherwise in real time relative to the request, the at least one capability of the device 104 and the currently available portion thereof, such as via an interrogation protocol, an application executing on the device 104 which provides the requisite data indicative of the device capabilities, a user agent string received from device 104, or combinations thereof. In one embodiment, device diagnostics may be implemented which interrogate the device 104 to assess the capabilities thereof. In one embodiment, devices 104 may be classified, profiled or otherwise categorized by their capabilities wherein device having substantially similar capabilities are grouped together. In such an implementation, the second logic 408 may cause the processor to determine to which one or more classifications the device 104 belongs, the capabilities identified by the particular classification being ascribed thereto. It will be appreciated that such classifications may overlap in that a device 104 may belong to more than classification, e.g. a device may be classified as a touch screen enabled device and a device with a seven-inch screen size. Accordingly, in one embodiment of the system 400, the second logic 408 may be further executable by the processor 402 to cause the processor 402 to define a plurality of device 104 classifications each characterized by a unique combination of device 104 capabilities and further determining, such as based on a device identifier, model number, etc., to which of the plurality of classifications the device 104, from the request was received, belongs, the determined classification defining the at least one capability.

As described above, due to the user's operation of a device 104 and/or the environment or location thereof, less than all of the capacity of a particular capability of the device 104 may be available at the time the request for access to the server 106 is received. For example, due to a large number of applications executing on the device 104 by the user, the available processing capacity, operating memory or storage may be diminished. Further, depending upon the number of applications utilizing the communications capabilities of the device 104 or the quality of the connection, the available bandwidth at the time of the request for access to the service 106 may be diminished.

The system 400 may further include third logic 410 stored in the memory 404 and executable by the processor 402 to cause the processor 402 to determine, based on the identified capability, as was described above, and the currently available portion thereof, a subset of user interface components of the set of user interface components 416, each characterized by the at least one requisite capability of the device 104 satisfied by the currently available portion of the capability of the device 104. In this way, only user interface components for which the execution requirements are met by the available capacity of the device 104 may be selected. Accordingly, some components may not be selected, and therefore access to the portion of the service enabled thereby may not be provided if the device 104 cannot support it.

The system 400 further includes fourth logic 412 stored in the memory 404 and executable by the processor 402 to cause the processor 402 to assemble, or otherwise render, construct, generate or compile, a user interface to facilitate access to the service 106 based on the determined subset of user interface components.

The system 400 further includes fifth logic 414 stored in the memory 404 and executable by the processor 402 to cause the processor 402 to provide the assembled user interface to the device 104 such that the device 104 may facilitate, e.g. in a manner which may be optimized to the available capabilities of the device 104, use of the functions implemented thereby by the user of the device 104 to access at least a portion of the service enabled thereby.

In one embodiment of the system 400, the first logic 406 may be further executable by the processor 402 to cause the processor 402 to receive, from the user of the device 104 from which the request was received, a specification of a portion of the at least one capability, or of the available portion thereof, which may be utilized by the system 400 to facilitate access to the service 106, the third logic 410 being further executable by the processor 402 to cause the processor 402 to determine, based on the identified capability and the user specified portion thereof, a subset of user interface components of the set of user interface components, each characterized by the at least one requisite capability of the device 104 satisfied by the user specified portion of the capability of the device 104. This may allow a user to specify preferences/preferential operation or otherwise override the determination of the system 400, so as to for example, utilize a particular user interface component regardless of whether it is optimized for the user's device 104, or use a component tailored for an available capability less than what is actually available to, for example, save on bandwidth consumption and/or cost.

It will be appreciated that, by operation of the disclosed system, different devices 104, i.e. devices 104 of different capabilities, may receive different sets of user interface components for accessing the same service 106. In particular, in one embodiment of the system 400, the first logic 406 may be further executable by the processor 402 to cause the processor 402 to receive a request from another device 104 to access the service, the other device 104 being characterized by at least one capability and a currently available portion thereof different from the device 104; the second logic 408 may be further executable by the processor 402 to cause the processor 402 to identify, based on the received request from the other device 104, the at least one capability of the other device 104 and the currently available portion thereof; the third logic 410 may be further executable by the processor 402 to cause the processor 402 to determine, based on the identified capability and the currently available portion thereof of the other device 104, another subset of user interface components of the set of user interface components 416, each characterized by the at least one requisite capability of the device 104 satisfied by the currently available portion of the capability of the other device 104; the fourth logic 412 is further executable by the processor 402 to cause the processor 402 to assemble another user interface to facilitate access to the service 106 based on the determined other subset of user interface components; and the fifth logic 414 is further executable by the processor 402 to cause the processor 402 to provide the assembled other user interface to the other device 104 such that the other device 104 may facilitate use of the functions implemented thereby by the user of the other device 104 to access at least a portion of the service 106 enabled thereby.

It will be appreciated that, by operation of the disclosed system, the same device 104 requesting or otherwise utilizing the same service but at different times, may, due to changes in the available capacities of the capabilities thereof, receive different sets of user interface components for accessing the same service 106. In particular, in one embodiment of the system 400, the first logic 406 may be further executable by the processor 402 to cause the processor 402 to receive another subsequent request from the device 104 to access the service 106, the device 104 being characterized by at least one capability and a currently available portion thereof different from the previous available portion; the second logic 408 may be further executable by the processor 402 to cause the processor 402 to identify, based on the received subsequent request, the at least one capability of the device 104 and the currently available portion thereof; the third logic 410 may be further executable by the processor 402 to cause the processor 402 to determine, based on the identified capability and the currently available portion thereof, another subset of user interface components of the set of user interface components 416, each characterized by the at least one requisite capability of the device 104 satisfied by the currently available portion of the capability of the other device 104; the fourth logic 412 may be further executable by the processor 402 to cause the processor 402 to assemble another user interface to facilitate access to the service 106 based on the determined other subset of user interface components; and the fifth logic 414 may be further executable by the processor 402 to cause the processor 402 to provide the assembled other user interface to the device 104 such that the device 104 may facilitate use of the functions implemented thereby by the user of the device 104 to access at least a portion of the service 106 enabled thereby. In particular, in one embodiment of the system 400, the second logic 408 may be further executable by the processor 402 to cause the processor 402 to reevaluate the available portion of the at least one capability and cause the third, fourth, fifth and sixth logic 408, 410, 412, 414 to be reexecuted by the processor 402 based thereon.

In one embodiment of the system 400, the fifth logic 414 may be further executable by the processor 402 to cause the processor 402 to indicate to the user one or more of the set of user interface components 416 not included in the subset, thereby, for example, allowing the user to select them for inclusion, or free up resources on their device 104 in order to obtain them.

Figure 5:
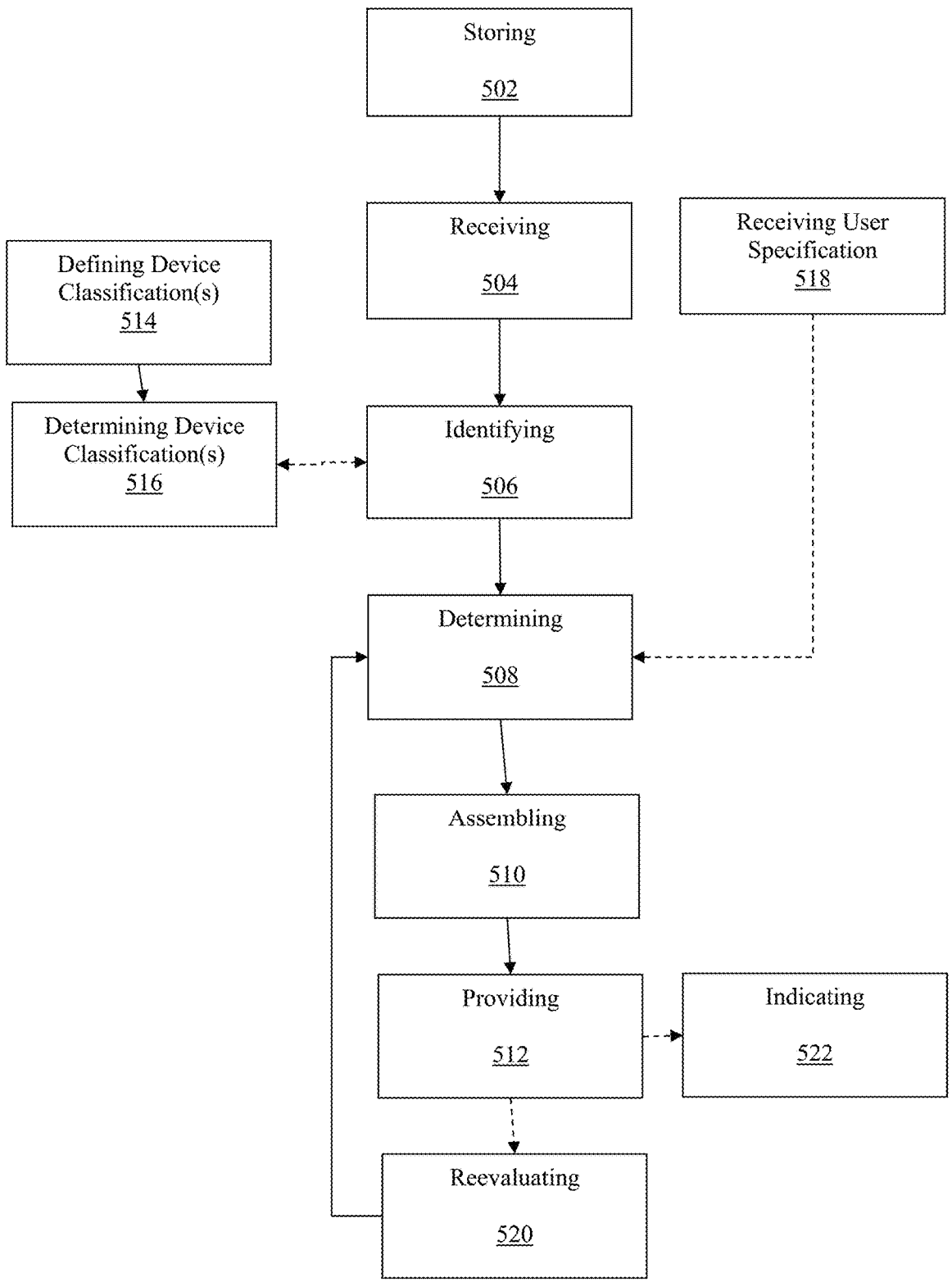
FIG. 5 depicts a flow chart showing operation of the system of FIG. 4.

FIG. 5 depicts a flow chart showing operation of the system 400 of FIG. 4. In particular FIG. 5 shows a computer implemented method for dynamically provisioning a set of functions to a device 104, such as a mobile device 104 as described above, to facilitate access to a service 106, implemented remote therefrom and/or locally at the device 104, by a user (not shown) thereof. The operation of the system 200 includes: providing or otherwise storing, by a processor 402, a set, library, or database of user interface components/widgets 416 in a memory 404 coupled with the processor 402, subsets thereof being operative to implement at least one of the set of functions to facilitate access to at least a portion of the service 106, each of the set of user interface components 416 being characterized by at least one requisite capability of the device 104, as described above, necessary for optimal, e.g. tailored to the available device capabilities, execution thereof by the device 104 [Block 502]; receiving, by the processor 402, a request from the device 104 to access the service 106, the device being 104 characterized by at least one capability and a currently available portion thereof [Block 504]; identifying, by the processor 402 based on the received request, e.g. at runtime or otherwise substantially in real time, the at least one capability of the device 104, as described above, such as based on a device classification, and the currently available portion thereof, such as via an interrogation protocol, an application executing on the device 104 which provides the data, a user agent string, decision tree, rule set, device profile, etc., [Block 506]; determining, by the processor 402 based on the identified capability and the currently available portion thereof, a subset of user interface components of the set of user interface components 416, each characterized by the at least one requisite capability of the device 104 satisfied by the currently available portion of the capability of the device 104 [Block 508]; assembling, by the processor 402, or otherwise rendering, constructing, generating, or compiling, a user interface to facilitate access to the service 106 based on the determined subset of user interface components [Block 510]; and providing, by the processor 402, the assembled user interface to the device 104 such that the device 104 may facilitate, e.g. optimally, use of the functions implemented thereby by the user of the device 104 to access at least a portion of the service 106 enabled thereby, i.e. wherein the user interface may be optimized to the capabilities of the device and the currently available capacity thereof [Block 512].

In one embodiment, the operation of the system 400 may further include defining a plurality of device 104 classifications each characterized by a unique combination of device capabilities [Block 514] and further determining, such as based on a device identifier or model number, to which of the plurality of classifications the device 104, from the request was received, belongs, the determined classification defining the at least one capability [Block 516].

In one embodiment, the operation of the system 400 may further include, receiving, by the processor 402 from the user of the device 104 from which the request was received, a specification of a portion of the at least one capability, or of the available portion thereof, which may be utilized to facilitate access to the service 106 [Block 518], the determining further comprising determining, by the processor 402 based on the identified capability and the user specified portion thereof, a subset of user interface components of the set of user interface components 416, each characterized by the at least one requisite capability of the device 104 satisfied by the user specified portion of the capability of the device 104 [Block 508].

In one embodiment, the operation of the system 400 may further include: receiving, by the processor 402, a request from another device 104 to access the service 106, the other device 104 being characterized by at least one capability and a currently available portion thereof different from the device [Block 504]; identifying, by the processor 402 based on the received request from the other device 104, the at least one capability of the other device 104 and the currently available portion thereof, such as via an interrogation protocol, an application executing on the device which provides the data, a user agent string, decision tree, rule set, device profile, etc. [Block 506]; determining, by the processor 402 based on the identified capability and the currently available portion thereof of the other device 104, another subset of user interface components of the set of user interface components 416, each characterized by the at least one requisite capability of the device 104 satisfied by the currently available portion of the capability of the other device 104 [Block 508]; assembling, by the processor 402, or otherwise rendering, constructing, generating, or compiling, another user interface to facilitate access to the service 106 based on the determined other subset of user interface components [Block 510]; and providing, by the processor 402, the assembled other user interface to the other device 104 such that the other device 104 may, e.g. optimally, facilitate use of the functions implemented thereby by the user of the other device 104 to access at least a portion of the service enabled thereby, i.e. wherein the user interface may be optimized to the capabilities of the device and the currently available capacity thereof [Block 512].

In one embodiment, the operation of the system 400 may further include: receiving, by the processor 402, another subsequent request from the device 104 to access the service 106, the device being characterized by at least one capability and a currently available portion thereof different from the previous available portion [Block 504]; identifying, by the processor 402 based on the received subsequent request, the at least one capability of the device 104 and the currently available portion thereof, such as via an interrogation protocol, an application executing on the device which provides the data, user agent string, decision tree, rule set, device profile, etc. [Block 506]; determining, by the processor 402 based on the identified capability and the currently available portion thereof, another subset of user interface components of the set of user interface components 416, each characterized by the at least one requisite capability of the device 104 satisfied by the currently available portion of the capability of the device 104 [Block 508]; assembling, by the processor 402, or otherwise rendering, constructing, generating, or compiling, another user interface to facilitate access to the service 106 based on the determined other subset of user interface components [Block 510]; and providing, by the processor 402, the assembled other user interface to the device 104 such that the device 104 may, e.g. optimally, facilitate use of the functions implemented thereby by the user of the device 104 to access at least a portion of the service 106 enabled thereby, and wherein the user interface may be optimized to the capabilities of the device and the currently available capacity thereof [Block 512]. In particular, the operation of the system 400 may further include: reevaluating, by the processor 402, the available portion of the at least one capability and repeating the determining, assembling and providing based thereon, such as during the time the application is running on the device 104. [Block 520].

In one embodiment, the operation of the system 400 further includes indicating, by the processor 402, to the user one or more of the set of user interface components 416 not included in the subset so as to, for example, allow the user to select them for inclusion or switch to a less resource demanding variant [Block 522].

Figure 11:
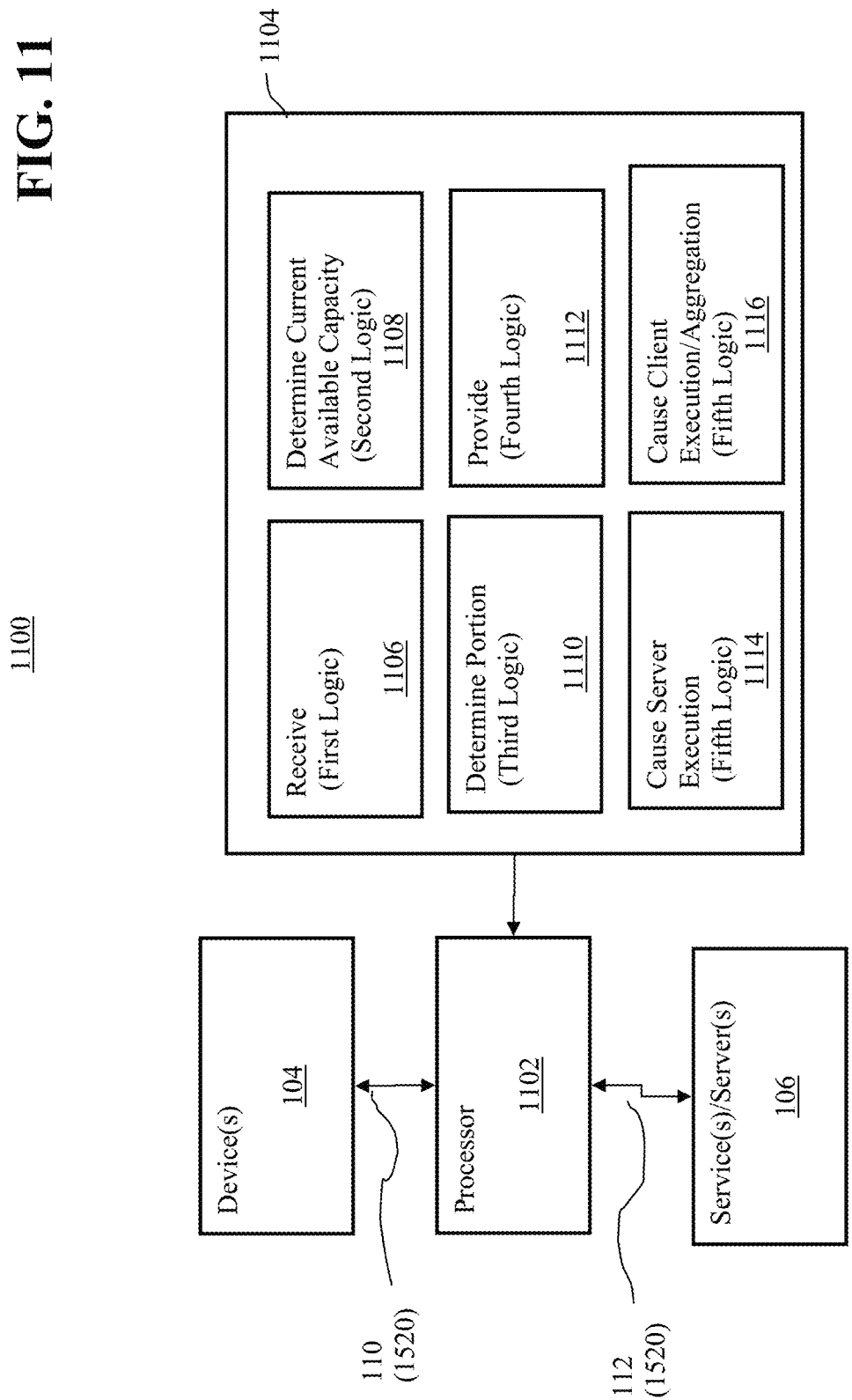
FIG. 11 depicts a block diagram of an exemplary implementation of a system for dynamic execution for use with the system of FIGS. 1 and 2, according to one embodiment.

FIG. 11 depicts a block diagram for provision of a service 106A by a server 106 to a client device 104, the service 106A being based on execution of a plurality of computations. The device 104 may be a mobile device 104, such as a smart phone, cellular phone, tablet computing device, laptop computer, etc., which accesses the service 106, at least in part, via a wireless connection, e.g. Wi-Fi, 3G, 4G, etc., as was described above. The service 106A may comprise, for example, a financial trading/data service for market data analysis. In particular, the service 106A may include calculation of a financial value, such as a profit/loss, greek, performance metric, risk/margin, etc. Alternatively, in non-financial implementations, the service 106A may relate to image processing, text/speech conversion, translation, image/optical recognition, navigational routing, etc. In particular, the service 106A may be a computer software application, each of the plurality of computations being operative to facilitate operation of the computer software application and wherein some of the computations may be for generating the user interface and others for processing data received therefrom or provided thereto.

The system 1100 includes a processor 1102 and a memory 1104 coupled therewith, which may be a non-transitory volatile or non-volatile memory and may be implemented by the processor 1502 and memory 1504 as described below with respect to FIG. 15. The system 1100 further includes first logic 1106 stored in a memory 1104 and executable by a processor 1102 to cause the processor 1102 to receive a request for the service from the client device 104; second logic 1108 stored in the memory 1104 and executable by the processor 1102 to cause the processor 1102 to determine, responsive to the request, e.g. at run time or otherwise in real time, a currently available capacity for the client device 104 to execute the plurality of computations; third logic 1110 stored in the memory 1104 and executable by the processor 1102 to cause the processor 1102 to determine a portion of the plurality of computations to be executed by the client device 104 based on the determined currently available capacity therefore, the remainder of the plurality of computations to be executed by the server 106 (or other intermediary such as the mobile gateway 108); fourth logic 1112 stored in the memory 1104 and executable by the processor 1102 to cause the processor 1102 to provide the determined portion of the plurality of computations to the client device 104 for execution thereby; fifth logic 1114 stored in the memory 1104 and executable by the processor 1102 to cause the processor 1102 to cause the server 106, or other intermediary, to execute the remainder of the plurality of computations and provide the result thereof to the client device 104; and sixth logic 1116 stored in the memory 1104 and executable by the processor 1102 to cause the processor 1102 to cause the client device 104 to execute the determined portion of the plurality of computations provided thereto to obtain a result therefrom and combine, or otherwise aggregate, the obtained result with the result received from the server 106, or other intermediary, and present the combined/aggregate result to a user of the client device 104.

In one embodiment, the currently available capacity for the client device 104 to execute the plurality of computations may be determined based on the client device 104's currently available processing capacity, display capacity, communication capacity, memory capacity, storage capacity, or a combination thereof, as was described above. In one embodiment, the currently available capacity for the client device 104 to execute the plurality of computations may be further determined based at least in part on a specification of a user of the client device 104 specifying the currently available capacity.

It will be appreciated that the determined portion of the plurality of computations to be executed by the client device 104 may include all of the plurality of computations or none of them, or any apportionment there between. For example, in a hybrid implementation, some of the computations may be executed by the client device 104 where the remainder are executed by the server 106 or other intermediary.

In one embodiment of the system 1100, the first logic 1106 may be further executable by the processor 1102 to cause the processor 1102 to receive a request for the service 106A from another client device 104; the second logic 1108 may be further executable by the processor 1102 to cause the processor 1102 to determine, responsive to the request from the other client device 104, a currently available capacity for the other client device 104 to execute the plurality of computations, the currently available capacity for the other client device 104 being different from the currently available capacity of the client device 104; the third logic 1110 may be further executable by the processor 1102 to cause the processor 1102 to determine a portion of the plurality of computations to be executed by the other client device 104 based on the determined currently available capacity therefore, the remainder of the plurality of computations to be executed by the server 106, or other intermediary, wherein the apportionment may be different; the fourth logic 1112 may be further executable by the processor 1102 to cause the processor 1102 to provide the determined portion of the plurality of computations to the other client device 104 for execution thereby; the fifth logic 1114 may be further executable by the processor 1102 to cause the processor 1102 to cause the server 106, or other intermediary, to execute the remainder of the plurality of computations and provide the result thereof to the other client device 104; and the sixth logic 1116 may be further executable by the processor 1102 to cause the processor 1102 to cause, the other client device 104 to execute the determined portion of the plurality of computations provided thereto to obtain a result therefrom and combine, or otherwise aggregate, the obtained result with the result received from the server 106, or other intermediary, and present the combined/aggregate result to a user of the other client device 104.

In one embodiment of the system 1100, the first logic 1106 may be further executable by the processor 1102 to cause the processor 1102 to receive a subsequent request for the service 106A from the client device 104; the second logic 1108 may be further executable by the processor 1102 to cause the processor 1102 to determine, responsive to the subsequent request, a currently available capacity for the client device 104 to execute the plurality of computations, the currently available capacity being different from the currently available capacity determined for the previous request; the third logic 1110 may be further executable by the processor 1102 to cause the processor 1102 to determine a portion of the plurality of computations to be executed by the client device 104 based on the determined currently available capacity therefore, the remainder of the plurality of computations to be executed by the server 106, or other intermediary, wherein the apportionment may be different; the fourth logic 1112 may be further executable by the processor 1102 to cause the processor 1102 to provide the determined portion of the plurality of computations to the client device 104 for execution thereby; the fifth logic 1114 may be further executable by the processor 1102 to cause the processor 1102 to cause the server 106, or other intermediary, to execute the remainder of the plurality of computations and provide the result thereof to the client device 104; and the sixth logic 1116 may be further executable by the processor 1102 to cause the processor 1102 to cause the client device 104 to execute the determined portion of the plurality of computations provided thereto to obtain a result therefrom and combine, or otherwise aggregate, the obtained result with the result received from the server 106, or other intermediary, and present the combined/aggregate result to a user of the client device 104.

Figure 12:
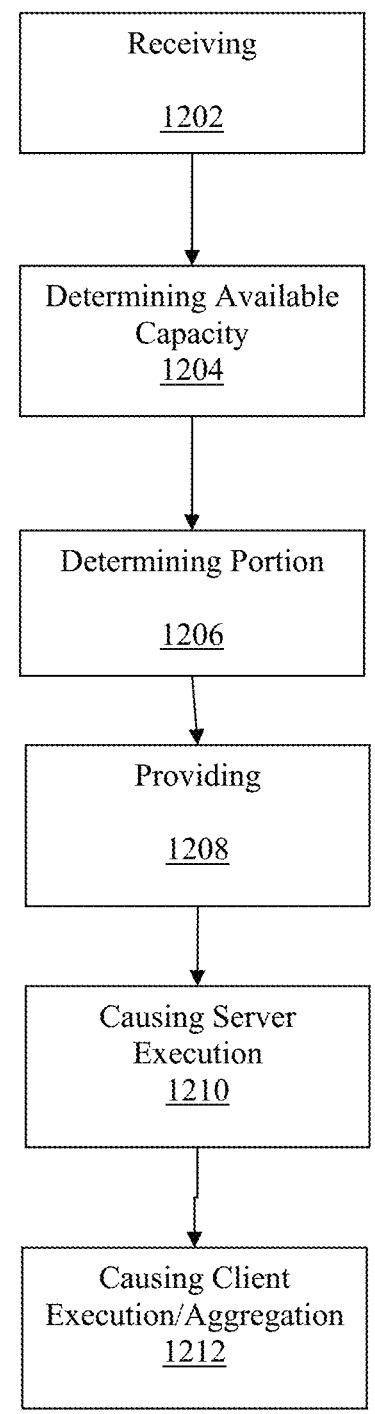
FIG. 12 depicts a flow chart showing operation of the system of FIG. 11.

FIG. 12 depicts a flow chart showing operation of the system 1100 of FIG. 11. In particular FIG. 12 shows a computer implemented method for providing a service by a server 106 to a client device 104, the service being based on execution of a plurality of computations. The device 104 may be a mobile device 104, such as a smart phone, cellular phone, tablet computing device, laptop computer, etc., which accesses the service 106, at least in part, via a wireless connection, e.g. Wi-Fi, 3G, 4G, etc., as was described above. The service 106A may comprise, for example, a financial trading/data service for market data analysis. In particular, the service 106A may include calculation of a financial value, such as a profit/loss, greek, performance metric, risk/margin, etc. Alternatively, in non-financial implementations, the service 106A may relate to image processing, text/speech conversion, translation, image/optical recognition, navigational routing, etc. In particular, the service 106A may be a computer software application, each of the plurality of computations being operative to facilitate operation of the computer software application and wherein some of the computations may be for generating the user interface and others for processing data received therefrom or provided thereto.

The operation of the system 1100 includes: receiving, by a processor 1102, a request for the service from the client device 104 [Block 1202]; determining, by the processor 1102, responsive to the request, e.g. at run time or otherwise in real time, a currently available capacity for the client device 104 to execute the plurality of computations [Block 1204]; determining, by the processor 1102, a portion, i.e. zero or more, of the plurality of computations to be executed by the client device 104 based on the determined currently available capacity therefore, the remainder of the plurality of computations to be executed by the server 106, or other intermediary such as the mobile gateway 108 [Block 1206]; providing, by the processor 1102, the determined portion of the plurality of computations to the client device 104 for execution thereby [Block 1208]; causing, by the processor 1102, the server 106, or other intermediary, to execute the remainder of the plurality of computations and provide the result thereof to the client device 104 [Block 1210]; and causing, by the processor 1102, the client device 104 to execute the determined portion of the plurality of computations provided thereto to obtain a result therefrom and combine, or otherwise aggregate, the obtained result with the result received from the server 106, or other intermediary, and present the combined/aggregate result to a user of the client device 104 [Block 1212].

In one embodiment, the currently available capacity for the client device 104 to execute the plurality of computations may be determined based on the client device 104's currently available processing capacity, display capacity, communication capacity, memory capacity, storage capacity, or a combination thereof, as was described above. In one embodiment, the currently available capacity for the client device 104 to execute the plurality of computations may be further determined based at least in part on a specification of a user of the client device 104 specifying the currently available capacity.

It will be appreciated that the determined portion of the plurality of computations to be executed by the client device 104 may include all of the plurality of computations or none of them, or any apportionment there between.

In one embodiment, the operation of the system 1100 further includes: receiving, by the processor 1102, a request for the service 106A from another client device 104 [Block 1202]; determining, by the processor 1102, responsive to the request from the other client device 104, a currently available capacity for the other client device 104 to execute the plurality of computations, the currently available capacity for the other client device 104 being different from the currently available capacity of the client device 104 [Block 1204]; determining, by the processor 1102, a portion of the plurality of computations to be executed by the other client device 104 based on the determined currently available capacity therefore, the remainder of the plurality of computations to be executed by the server 106, or other intermediary, [Block 1206], wherein the apportionment may be different; providing, by the processor 1102, the determined portion of the plurality of computations to the other client device 104 for execution thereby [Block 1208]; causing, by the processor 1102, the server 106 to execute the remainder of the plurality of computations and provide the result thereof to the other client device 104 [Block 1210]; and causing, by the processor 1102, the other client device 104 to execute the determined portion of the plurality of computations provided thereto to obtain a result therefrom and combine, or otherwise aggregate, the obtained result with the result received from the server 106, or other intermediary, and present the combined/aggregate result to a user of the other client device 104 [Block 1212].

In one embodiment, the operation of the system 1100 may further include: receiving, by the processor 1102, a subsequent request for the service 106A from the client device 104 [Block 1202]; determining, by the processor 1102, responsive to the subsequent request, a currently available capacity for the client device 104 to execute the plurality of computations, the currently available capacity being different from the currently available capacity determined for the previous request [Block 1204]; determining, by the processor 1102, a portion of the plurality of computations to be executed by the client device 104 based on the determined currently available capacity therefore, the remainder of the plurality of computations to be executed by the server 106, or other intermediary, [Block 1206], wherein the apportionment may be different; providing, by the processor 1102, the determined portion of the plurality of computations to the client device 104 for execution thereby [Block 1208]; causing, by the processor 1102, the server 106, or other intermediary, to execute the remainder of the plurality of computations and provide the result thereof to the client device 104 [Block 1210]; and causing, by the processor 1102, the client device 104 to execute the determined portion of the plurality of computations provided thereto to obtain a result therefrom and combine, or otherwise aggregate, the obtained result with the result received from the server 106, or other intermediary, and present the combined/aggregate result to a user of the client device 104 [Block 1212].

Figure 13:
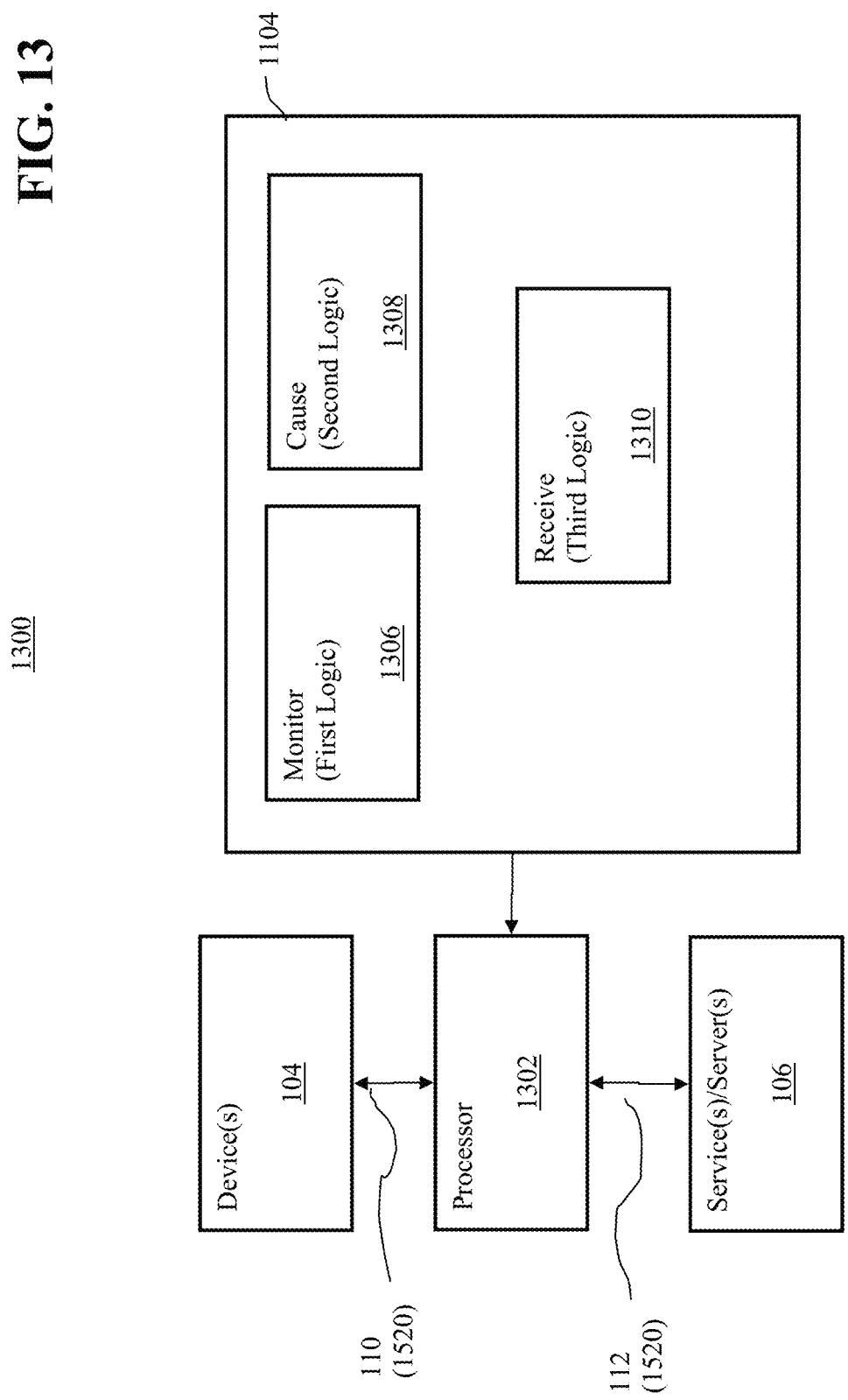
FIG. 13 depicts a block diagram of an exemplary implementation of a system for dynamic data communications for use with the system of FIGS. 1 and 2, according to one embodiment.

FIG. 13 depicts a block diagram of a system 1300 for dynamic management of utilization of at least one capability of a device 104, such as a mobile device 104, the device 104 executing at least one application, e.g. user interface or component/widget thereof, operative to receive a plurality of data transmitted from a data source to the device over a period of time. In one embodiment, the system 1300 may be a subsystem of a mobile gateway/intermediary 108, as was described above, which facilitates communications between the data source, e.g. server/service, 106 and the device 104. The device 104 may be a mobile device 104, such as a smart phone, cellular phone, tablet computing device, laptop computer, etc., which accesses the service 106, at least in part, via a wireless connection, e.g. Wi-Fi, 3G, 4G, etc., as was described above. The service 106 may comprise a financial trading/data service via which a user may have access to market data, as well as market data analysis tools/functions, and via which the user may place orders to trade financial products and view the results thereof. The data may be market data, such as market prices of one of more financial products generated by a market data source, such as a financial exchange, which may be the data source, server/service, 106 or may provide the data to the data source, server/service 106. Alternatively, the data may be any time sensitive data, such as live video or other real time data, which may be unique or otherwise be characterized by a significance with respect to the time of availability, e.g. the time the data content was generated or otherwise released or first made available, the content of the data, or combinations thereof.

The system 1300 includes a processor 1302 and a memory 1304 coupled therewith, which may be implemented by the processor 1502 and memory 1504 as described below with respect to FIG. 15. The system 1302 may be coupled with the device 104 via a network connection 110 which may be the network 1520 describe below with respect to FIG. 15 and may include at a portion of which is wireless. The system 1300 may further be coupled with the data source 106 via a network 112, which may also be implemented via the network 1520 described below with respect to FIG. 15. The system 1300 further includes first logic 1306 stored in a memory 1304 and executable by a processor 1302 to cause the processor 1302 to monitor, e.g. continuously, at static or varying intervals or otherwise substantially in real time with respect to the data transmission, during the period of time, which may be any period of time including any number of seconds, minutes, hours, days or fraction or multiple thereof, utilization of the at least one capability to determine an available portion thereof, or conversely, the unavailable portion thereof. The system 1300 further includes second logic 1308 stored in the memory 1304 and executable by the processor 1302 to cause the processor 1302 to cause, based on the determined available portion of the at least one capability of the device 104, the at least one application to cause the data source to modify the transmission of the data to the device 104. In this manner, the system 1300 may indirectly control the transmission of data from the data source 106 to the device 104. As such, the system 1300 need not be coupled with the data source 106 for this purpose as is shown in FIG. 2.

As described above, the at least one capability of the device 104 may include the display size, display resolution, available output devices, available input devices, available geo-locating device, communications capability, power capacity, processing capacity, operating memory capacity, storage capacity, or combinations thereof.

In one embodiment, the second logic 1308 may be further executable by the processor 1302 to cause the processor 1302 to determine that the available portion of the at least one capability has decreased and, based thereon, cause the at least one application to cause the data source to limit the transmission of the data to the device. For example, the second logic 1308 may be further executable by the processor 1302 to cause the processor 1302 to cause the at least one application to cause the data source 106 to reduce the rate at which the data is transmitted to the device 104, to reduce the amount of data which is transmitted to the device 104, to cause the data source to transmit data to the device only upon request therefore, to cause the data source to conflate the data prior to transmission, or combinations thereof.

In one embodiment, the system 1300 further comprising third logic 1310 stored in the memory 1304 and executable by the processor 1302 to cause the processor 1302 to receive, from the user of the device 104, a specification, e.g. user preference or selection, of an extent to which the at least one application can be caused to cause the data source to modify the transmission of the data to the device, the second logic being further executable by the processor to cause the processor to cause, based on the determined available portion of the at least one capability and the specification, the at least one application to cause the data source to modify the transmission of the data to the device. This allows a user to, for example, limit the extent to which the capacity utilization may be decreased or increased for the application.

In one embodiment, the at least one application may be operative to establish a subscription to the transmission of the data, the subscription defining, for example, the transmission rate, data volume, period of time, transmission mode, e.g. push or pull or rate thereof, or a combination thereof, the second logic 1308 being further executable by the processor 1302 to cause the processor 1302 to cause the at least one application to alter one of the transmission rate, data volume, period of time, transmission mode, or a combination thereof of the subscription.

In one embodiment, wherein the device 104 is further executing at least one other application operative to receive the same or another plurality of data transmitted from the data source 106, or a different data source, to the device 104 over the same or a different period of time, the second logic 1308 may be further executable by the processor 1302 to cause the processor 1302 to cause, based on the determined available portion of the at least one capability of the device 104, the at least one other application to cause the data source 106 to modify the transmission of the other data to the device 104, the modification of the transmission of the other data being different from the modification of the transmission of the data. This permits different applications or components/widgets thereof to receive data at different rates depending upon the utilization and, for example, the priority or user preference of one application/widget over another. It will be appreciated that the available portion determined for a second application may be affected by the portion consumed by the first application. The system 1300 may act to balance the usage among the applications/widgets, e.g. pro rata allocation, implement a first come first served allocation or implement another allocation or combination thereof.

Figure 14:
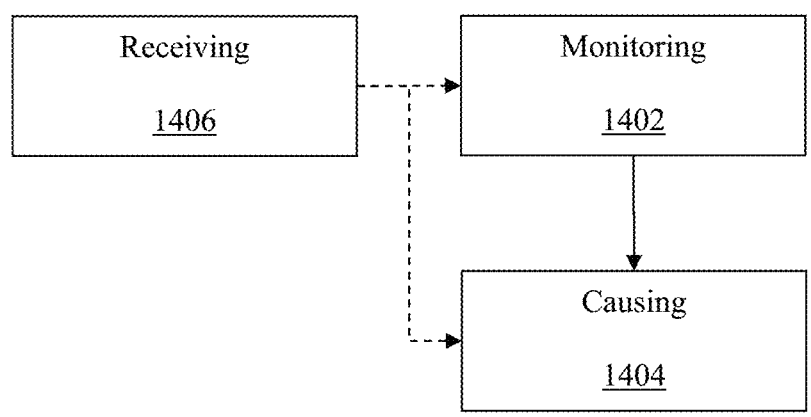
FIG. 14 depicts a flow chart showing operation of the system of FIG. 13.

FIG. 14 depicts a flow chart showing operation of the system 1300 of FIG. 13. In particular FIG. 14 shows a computer implemented method for dynamically managing utilization of at least one capability of a device 104, such as mobile/wireless device 104 as was described above, the device 104 executing at least one application, or component/widget thereof, operative to receive a plurality of data transmitted from a data source 106, or an originator of the data and/or any intervening/intermediary devices/transmitters therebetween, to the device 104 over a period of time. Wherein the device 104 may be executing at least one application operative to receive data from the data source 106, the data comprising a plurality of data items, each comprising content and being available for transmission at a particular time. The service 106 may comprise a financial trading/data service via which a user may have access to market data, as well as market data analysis tools/functions, and via which the user may place orders to trade financial products and view the results thereof. The data may be market data, such as market prices of one of more financial products generated by a market data source, such as a financial exchange, which may be the data source, server/service, 106 or may provide the data to the data source, server/service 106. Alternatively, the data may be any time sensitive data, such as live video or other real time data, which may be unique or otherwise be characterized by a significance with respect to the time of availability, e.g. the time the data content was generated or otherwise released or first made available, the content of the data, or combinations thereof.

The operation of the system 1300 includes: monitoring, e.g. continuously, at intervals or otherwise substantially in real time with the data transmission, by a processor 1302, which as described above may be implemented separately or otherwise remotely from the device 104 and/or separate from the at least one application, during the period of time, utilization of the at least one capability to determine an available portion thereof, or conversely, the unavailable portion (Block 1402); and causing, by the processor 1302 based on the determined available portion of the at least one capability of the device 104, the at least one application to cause the data source 106 to modify the transmission of the data to the device 104 (Block 1404). As was described above, the at least one capability of the device may include the display size, display resolution, available output devices, available input devices, available geo-locating device, communications capability, power capacity, processing capacity, operating memory capacity, storage capacity, or combinations thereof.

In one embodiment, the causing may further include determining, by the processor 1302, that the available portion of the at least one capability has decreased and, based thereon, causing, by the processor 1302, the at least one application to cause the data source 106 to limit the transmission of the data to the device 104, such as by causing the data source 106 to reduce the rate at which the data is transmitted to the device 104, causing the data source 106 to reduce the amount of data which is transmitted to the device 104, causing the data source 106 to transmit data to the device 104 only upon request therefore, causing the data source 106 to conflate the data prior to transmission, or combinations thereof.

In one embodiment, the operation of the system 1300 further includes receiving, by the processor 1302 from the user of the device 104, a specification, e.g. preference or selection, of an extent to which the at least one application can be caused to cause the data source 106 to modify the transmission of the data to the device 104, the causing further comprising causing, by the processor 1302 based on the determined available portion of the at least one capability and the specification, the at least one application to cause the data source 106 to modify the transmission of the data to the device (Block 1406).

In one embodiment, the at least one application may be operative to establish a subscription to the data transmission, the subscription defining, for example, the type, format or content of the data, the transmission rate, data volume, period of time, transmission mode, e.g. push or pull or rate thereof, or a combination thereof, the causing further comprising causing, by the processor 1302, the at least one application to alter one of the transmission rate, data volume, period of time, or a combination thereof of the subscription.

In one embodiment, wherein the device 104 is further executing at least one other application operative to receive another plurality of data transmitted from the data source 106 to the device 104 over a period of time, the method further comprising causing, by the processor 1302 based on the determined available portion of the at least one capability of the device 104, the at least one other application to cause the data source to modify the transmission of the other data to the device, the modification of the transmission of the other data being different from the modification of the transmission of the data.

One skilled in the art will appreciate that one or more modules or logic described herein may be implemented using, among other things, a tangible computer-readable medium comprising computer-executable instructions (e.g., executable software code). Alternatively, modules or logic may be implemented as software code, firmware code, hardware, and/or a combination of the aforementioned. For example, the modules may be embodied as part of the system 100 for interfacing with mobile devices described above.

Figure 15:
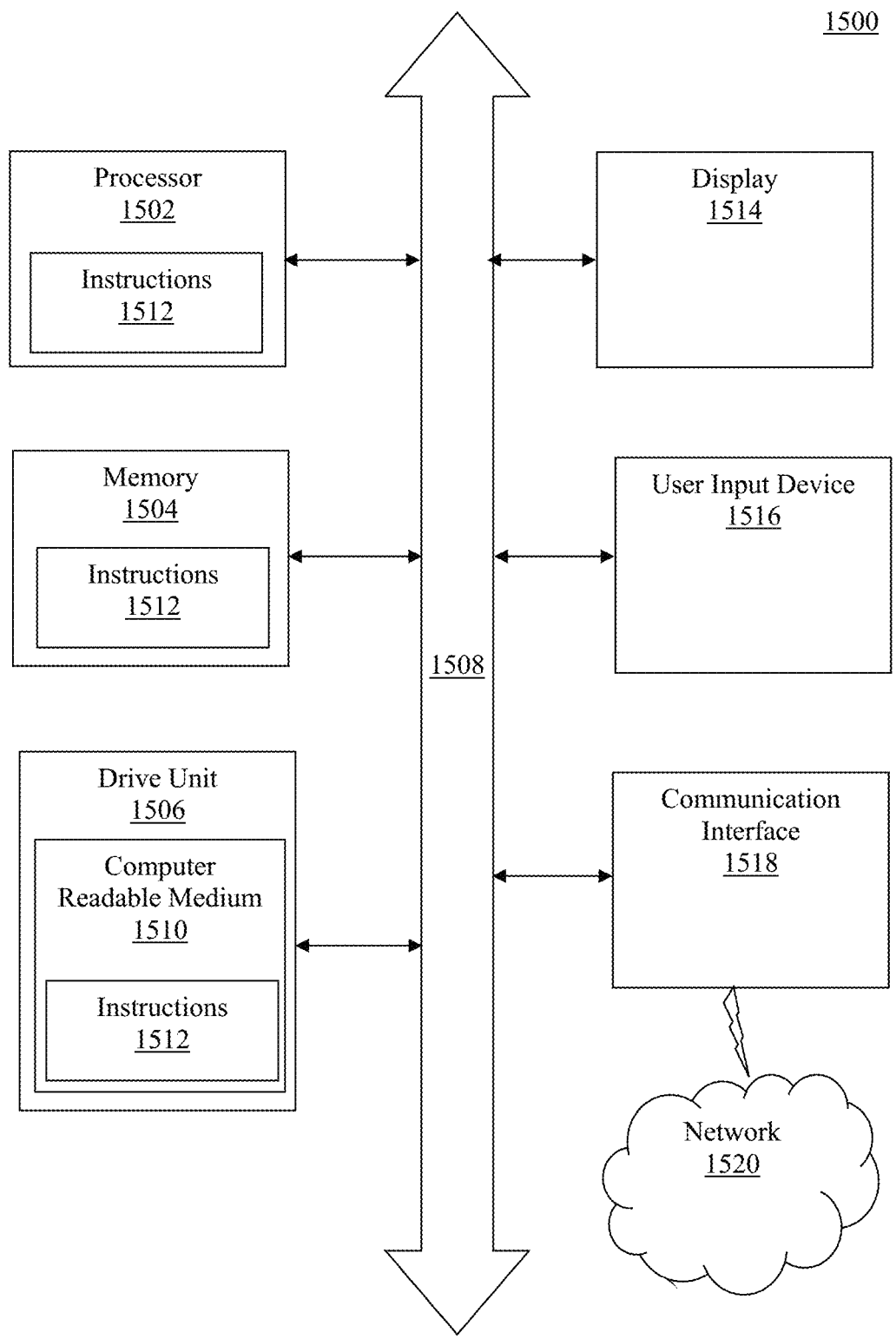
FIG. 15 depicts shows an illustrative embodiment of a general computer system for use with the system of FIGS. 1 and 2.

Referring to FIG. 15, an illustrative embodiment of a general computer system 1500 is shown. The computer system 1500 can include a set of instructions that can be executed to cause the computer system 1500 to perform any one or more of the methods or computer-based functions disclosed herein. The computer system 1500 may operate as a standalone device or may be connected, e.g., using a network, to other computer systems or peripheral devices. Any of the components discussed above, such as the processors 402, 1102, 1302, may be a computer system 1500 or a component in the computer system 1500. The computer system 1500 may implement one or more financial services provided to market participants via wireless mobile devices.

In a networked deployment, the computer system 1500 may operate in the capacity of a server or as a client user computer in a client-server user network environment, or as a peer computer system in a peer-to-peer (or distributed) network environment. The computer system 1500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1500 can be implemented using electronic devices that provide voice, video or data communication. Further, while a single computer system 1500 is illustrated, the term "system" shall also be taken to include any collection of systems or sub-systems that individually or jointly execute a set, or multiple sets, of instructions to perform one or more computer functions.

As illustrated in FIG. 15, the computer system 1500 may include a processor 1502, e.g., a central processing unit (CPU), a graphics processing unit (GPU), or both. The processor 1502 may be a component in a variety of systems. For example, the processor 1502 may be part of a standard personal computer or a workstation. The processor 1502 may be one or more general processors, digital signal processors, application specific integrated circuits, field programmable gate arrays, servers, networks, digital circuits, analog circuits, combinations thereof, or other now known or later developed devices for analyzing and processing data. The processor 1502 may implement a software program, such as code generated manually (i.e., programmed).

The computer system 1500 may include a memory 1504 that can communicate via a bus 1508. The memory 1504 may be a main memory, a static memory, or a dynamic memory. The memory 1504 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1504 includes a cache or random-access memory for the processor 1502. In alternative embodiments, the memory 1504 is separate from the processor 1502, such as a cache memory of a processor, the system memory, or other memory. The memory 1504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1504 is operable to store instructions executable by the processor 1502. The functions, acts or tasks illustrated in the figures or described herein may be performed by the programmed processor 1502 executing the instructions 1512 stored in the memory 1504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1500 may further include a display unit 1514, such as a liquid crystal display (LCD), an organic light emitting diode (OLED), a flat panel display, a solid-state display, a cathode ray tube (CRT), a projector, a printer or other now known or later developed display device for outputting determined information. The display 1514 may act as an interface for the user to see the functioning of the processor 1502, or specifically as an interface with the software stored in the memory 1504 or in the drive unit 1506.

Additionally, the computer system 1500 may include an input device 1516 configured to allow a user to interact with any of the components of system 1500. The input device 1516 may be a number pad, a keyboard, or a cursor control device, such as a mouse, or a joystick, touch screen display, remote control or any other device operative to interact with the system 1500.

In a particular embodiment, as depicted in FIG. 15, the computer system 1500 may also include a disk or optical drive unit 1506. The disk drive unit 1506 may include a computer-readable medium 1510 in which one or more sets of instructions 1512, e.g. software, can be embedded. Further, the instructions 1512 may embody one or more of the methods or logic as described herein. In a particular embodiment, the instructions 1512 may reside completely, or at least partially, within the memory 1504 and/or within the processor 1502 during execution by the computer system 1500. The memory 1504 and the processor 1502 also may include computer-readable media as discussed above.

The present disclosure contemplates a computer-readable medium that includes instructions 1512 or receives and executes instructions 1512 responsive to a propagated signal, so that a device connected to a network 1520 can communicate voice, video, audio, images or any other data over the network 1520. Further, the instructions 1512 may be transmitted or received over the network 1520 via a communication interface 1518. The communication interface 1518 may be a part of the processor 1502 or may be a separate component. The communication interface 1518 may be created in software or may be a physical connection in hardware. The communication interface 1518 is configured to connect with a network 1520, external media, the display 1514, or any other components in system 1500, or combinations thereof. The connection with the network 1520 may be a physical connection, such as a wired Ethernet connection or may be established wirelessly as discussed below. Likewise, the additional connections with other components of the system 1500 may be physical connections or may be established wirelessly.

The network 1520 may include wired networks, wireless networks, or combinations thereof. The wireless network may be a cellular telephone network, an 802.11, 802.16, 802.20, or WiMax network. Further, the network 1520 may be a public network, such as the Internet, a private network, such as an intranet, or combinations thereof, and may utilize a variety of networking or application layer protocols now available or later developed including, but not limited to TCP/IP or HTTP based networking or application layer protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission, such as application layer or transport later standards (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for dynamically managing utilization of at least one capability of a device, the device executing at least one application operative to receive a plurality of data transmitted from a data source to the device over a period of time, the method comprising:
    receiving, by a processor of an intermediary device coupled between the device and the data source, a parameter for the at least one application;
    monitoring, by the processor of the intermediary device, during the period of time, utilization of the at least one capability to determine an available portion thereof; and
    causing, by the processor of the intermediary device based on the determined available portion of the at least one capability of the device and the parameter, the at least one application executing on the device to cause the data source to modify the transmission of the data to the device.

2. The computer implemented method of claim 1, wherein the parameter includes a designated capacity threshold by which the processor may consider when causing modification of the transmission of the data to the device.

3. The computer implemented method of claim 1, wherein the parameter includes a designated priority for the at least one application by which the processor may consider when causing modification of the transmission of the data to the device.

4. The computer implemented method of claim 1, wherein the parameter is provided by a provider of the at least one application.

5. The computer implemented method of claim 1, wherein the parameter includes a trading volume level threshold by which the processor of the intermediary device may consider when determining to cause modification the data transmission thereto, wherein the processor of the intermediary device is further configured to cause a transmission rate from the data source to the device to be lowered when trading volume drops and to be raised when trading volume rises.

6. The computer implemented method of claim 1, wherein the parameter includes a volatility threshold by which the processor of the intermediary device may consider when determining to cause modification the data transmission thereto, wherein the processor of the intermediary device is further configured to cause a transmission rate from the data source to the device to be lowered when volatility drops and to be raised when volatility rises.

7. The computer implemented method of claim 1, wherein the at least one capability of the device comprises communications bandwidth between the data source and the device, medium of communication between the device and the data source, processing capacity of the device, memory capacity of the device, storage capacity of the device, or available power of the device.

8. The computer implemented of claim 7, wherein the medium of communication comprises wi-fi or cellular, whereby available communication bandwidth changes when the device switches between wi-fi and cellular as the medium of communication.

9. The computer implemented method of claim 1, wherein the parameter is dynamically configured over the period of time.

10. A system for dynamically managing utilization of at least one capability of a device, the device executing at least one application operative to receive a plurality of data transmitted from a data source to the device over a period of time, the system comprising:
first logic stored in a memory and executable by a processor of an intermediary coupled with a device that is further coupled with a data source to cause the processor to receive a parameter for the at least one application;
second logic stored in the memory and executable by the processor to cause the processor to monitor during the period of time, utilization of the at least one capability to determine an available portion thereof; and
third logic stored in the memory and executable by the processor to cause the processor to cause based on the determined available portion of the at least one capability of the device and the parameter, the at least one application executing on the device to cause the data source to modify the transmission of the data to the device.

11. The system of claim 10, wherein each of the plurality of data comprises a current price of a financial instrument as of a time it is to be transmitted by the data source.

12. The system of claim 10, wherein the plurality of data comprises financial, video or audio data.

13. The system of claim 10, wherein the parameter includes a designated capacity threshold by which the processor may consider when determining to cause modification the data transmission thereto.

14. The system of claim 10, wherein the parameter includes a designated priority for the at least one application by which the processor may consider when determining to cause modification the data transmission thereto.

15. The system of claim 10, wherein the at least one capability of the device comprises communications bandwidth between the data source and the device, medium of communication between the device and the data source, processing capacity of the device, memory capacity of the device, storage capacity of the device, or available power of the device.

16. The system of claim 15, wherein the medium of communication comprises wi-fi or cellular, whereby available communication bandwidth changes when the device switches between wi-fi and cellular as the medium of communication.

17. The system of claim 10, wherein the parameter includes a trading volume level threshold by which the processor may consider when determining to cause modification the data transmission thereto, wherein the second logic is further executable by the processor to cause the processor to cause a transmission rate from the data source to the device to be lowered when trading volume drops and to be raised when trading volume rises.

18. The system of claim 10, wherein the parameter includes a volatility level threshold by which the processor may consider when determining to cause modification the data transmission thereto, wherein the second logic is further executable by the processor to cause the processor to cause a transmission rate from the data source to the device to be lowered when volatility drops and to be raised when volatility rises.

19. A system for dynamically managing utilization of at least one capability of a device, the device executing at least one application operative to receive a plurality of data transmitted from a data source to the device over a period of time, the system comprising computer executable program code stored in a non-transitory memory and executable by a processor coupled therewith of an intermediary device coupled with the device that is further coupled with the data source to cause the processor to receive a parameter for the at least one application, monitor during the period of time, utilization of the at least one capability to determine an available portion thereof, and cause based on the determined available portion of the at least one capability of the device and the parameter, the at least one application executing on the device to cause the data source to modify the transmission of the data to the device.

20. The system of claim 19, wherein the parameter includes a trading volume level threshold by which the processor may consider when determining to cause modification the data transmission thereto, wherein the computer executable program code causes the processor to cause a transmission rate from the data source to the device to be lowered when trading volume drops and to be raised when trading volume rises.

21. The system of claim 19, wherein the parameter includes a volatility level threshold by which the processor may consider when determining to cause modification the data transmission thereto, wherein the computer executable program code causes the processor to cause a transmission rate from the data source to the device to be lowered when volatility drops and to be raised when volatility rises.

* * * * *